United States Patent
Ashizaki et al.

(10) Patent No.: US 8,118,398 B2
(45) Date of Patent: Feb. 21, 2012

(54) DISC RECORDING AND/OR REPRODUCING APPARATUS AND MIST ADSORBING METHOD OF THE DISC RECORDING AND/OR REPRODUCING APPARATUS

(75) Inventors: Koji Ashizaki, Tokyo (JP); Yuichiro Ikemoto, Kanagawa (JP); Seiji Kobayashi, Kanagawa (JP); Takeshi Matsui, Tokyo (JP); Tatsumi Ito, Kanagawa (JP); Shintaro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/351,949

(22) Filed: Jan. 12, 2009

(65) Prior Publication Data

US 2009/0183188 A1    Jul. 16, 2009

(30) Foreign Application Priority Data

Jan. 16, 2008    (JP) ................ P2008-007155

(51) Int. Cl.
  *B41J 2/165*    (2006.01)
  *B41J 3/00*    (2006.01)
(52) U.S. Cl. .............................. 347/34; 347/2

(58) Field of Classification Search .............. 347/34, 347/2
  See application file for complete search history.

(56) References Cited

U.S. PATENT DOCUMENTS

| 5,646,659 A | 7/1997 | Moriyama et al. |
| 2006/0232632 A1* | 10/2006 | Kosugi .................. 347/55 |

FOREIGN PATENT DOCUMENTS

| JP | 05-124187 A | 5/1993 |
| JP | 5-238005 | * 5/1993 |
| JP | 2002-046305 A | 2/2002 |
| JP | 2004-114517 A | 4/2004 |
| JP | 2006-256291 A | 9/2006 |
| JP | 2006-272635 A | 10/2006 |

* cited by examiner

*Primary Examiner* — Julian Huffman
(74) *Attorney, Agent, or Firm* — Wolf, Greenfield & Sacks, P.C.

(57) ABSTRACT

A disc recording and/or reproducing apparatus includes a disc mounting unit to which a disc recording medium is removably mounted, the disc mounting unit rotating the disc recording medium; a print head which discharges an ink drop towards a label surface of the disc recording medium that is rotationally driven by the disc mounting unit; and a mist attracting unit which, by applying a voltage, attracts mist of the ink drop discharged from the print head, the mist attracting unit provided near the disc recording medium mounted to the disc mounting unit.

7 Claims, 27 Drawing Sheets

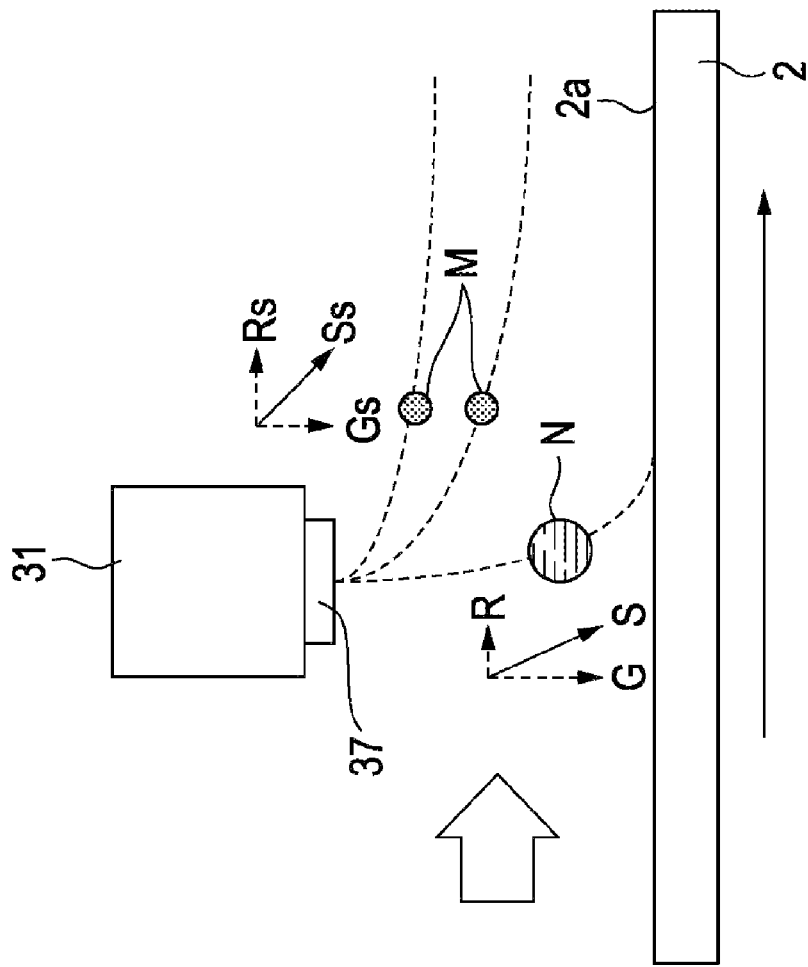
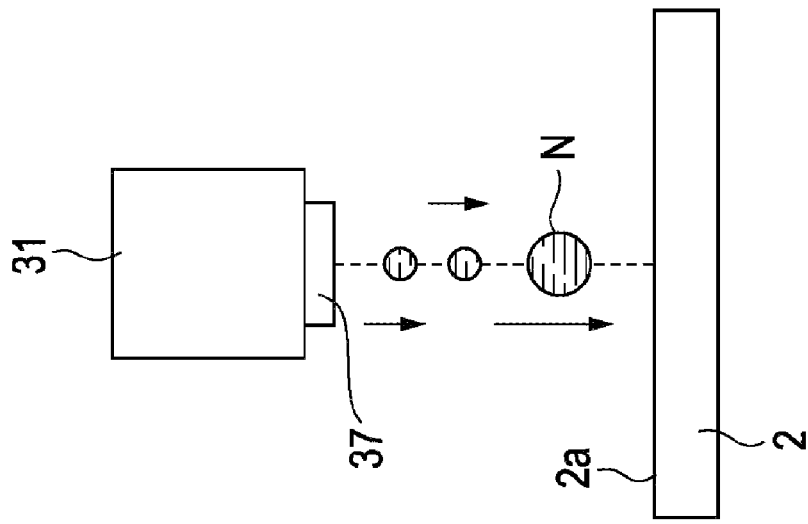

DISC RECORDING AND/OR REPRODUCING APPARATUS AND MIST ADSORBING METHOD OF THE DISC RECORDING AND/OR REPRODUCING APPARATUS

CROSS REFERENCES TO RELATED APPLICATIONS

The present invention contains subject matter related to Japanese Patent Application JP 2008-007155 filed in the Japanese Patent Office on Jan. 16, 2008, the entire contents of which are incorporated herein by reference.

BACKGROUND OF THE INVENTION

1. Field of the Invention

The present invention relates to a disc recording and/or reproducing apparatus which can record (write) or reproduce (read out) information using a disc recording medium (used as a recording medium) and a recording/reproducing method that uses, for example, light or near field light (having a propagation distance that is shorter than the wavelength of light), or light and magnetism, or only magnetism. More particularly, the present invention relates to a disc recording and/or reproducing apparatus having a label printing function capable of adsorbing a mist of ink drops generated when information recorded on a disc recording medium (used in the disc recording and/or reproducing apparatus) or, for example, items related to the information are printed onto, for example, a label surface using, for example, characters, symbols, photographs, pictures, or patterns. In addition, more particularly, the present invention relates to a mist adsorbing method of adsorbing mist generated when this printing is performed.

2. Description of the Related Art

An optical disc apparatus using an optical disc as a recording medium is generally known as a typical example of a disc recording and/or reproducing apparatus that records or reproduces information using a disc recording medium. The optical disc apparatus is known as an apparatus that writes and reads out data using as a recording medium an optical disc, such as a CD or a DVD, having a recording capacity of a few megabytes or a few gigabytes. In general, the optical disc apparatus is widely used. The types of optical disc apparatuses can be divided in accordance with methods of handling the optical disc, that is, into a tray method and a slot-in method.

A tray-type optical disc apparatus includes a tray capable of being inserted into and removed from a housing of the apparatus. An optical disc placed on the tray is conveyed to a disc mounting position (where a recording/reproducing operation in the housing of the apparatus is executed) and to a disc removal position (situated outside the housing of the apparatus). In contrast, in a slot-in type optical disc apparatus, a disc slot is formed in a housing of the apparatus and a disc conveying mechanism that sandwiches and conveys an optical disc is provided at the inner side of the disc slot. In the slot-in type optical disc apparatus, when the optical disc is inserted into the disc slot, the disc conveying mechanism sandwiches the optical disc and conveys it to the disc mounting position. In addition, when a disc ejecting operation is selected by operating an eject button, the disc conveying mechanism holds the optical disc and conveys it from the disc mounting position to the disc removal position.

There is a strong demand for such optical disc apparatuses to, for example, have high recording capacity and perform high-density recording. As a result, in recent years, for example, Blu-Ray Disc (BD) (trademark) and High Definition-Digital Versatile Disc (HD-DVD), which can perform high-density recording, have been provided. A basic structure of the BD and HD-DVD is similar to that of a related optical disc apparatus (such as a DVD). By reducing the wavelength of a light source and increasing the numerical aperture (NA) of a lens, the recording capacities of the BD and the HD-DVD are increased from five times to at least 10 times the recording capacity of, for example, a DVD. When the number of optical disc apparatuses that can perform high-density recording is increased, the amount of information that is recorded is significantly increased. When the number of recorded optical discs is increased, the optical discs can no longer be easily handled.

The basics of information management of optical discs is to make clear what is recorded on the optical discs. As a method for achieving this, the following method has been proposed. In the method, for example, the content of recorded information is written as an information signal to an information recording surface of an optical disc, and is manually written to a label surface provided opposite to the information recording surface. As a method of writing information to a label surface, the following method has been proposed. In the method, a printing device having an inkjet print head is mounted to an optical disc apparatus, and the information is written using the printing device.

As an apparatus for performing label printing in such an optical disc apparatus, for example, an optical disc apparatus having an inkjet head mounted to an optical disc drive and performing label printing on a rotating optical disc has been proposed (refer to, for example, Japanese Unexamined Patent Application Publication No. 5-238005).

Hitherto, in an inkjet printing device that performs printing on a print medium, such as paper, in addition to an optical disc, when ink drops are discharged from a print head, floating mist (ink drops) is produced in a space between the print head and a print object without the floating mist (the ink drops) reaching a print object surface. When this mist is discharged from the print head, the mist loses speed due to air resistance, moves on air currents in a vicinity thereof, and floats. Therefore, when the floating mist is scattered to the vicinity thereof, the floating mist adheres to portions other than a print surface, thereby staining the interior of the device.

A way of overcoming this problem in such an inkjet printing device is discussed in, for example, Japanese Unexamined Patent Application Publication No. 5-124187. This document discusses an inkjet recording apparatus in which ink drops or some of the ink drops ejected by a recording head are controlled or collected by electrostatic force to perform a recording operation. The inkjet recording apparatus discussed in this document (first related example) includes an inkjet recording head, a first electrode, a second electrode, and a voltage controller. The inkjet recording head has an ejection opening that ejects ink drops and an energy generator that causes ink in the ejection opening to be ejected. The first electrode is provided so as to be electrically conductive with the ink in the ejection opening. The second electrode is separated from the ejection opening by a predetermined distance and faces the ejection opening. The voltage controller applies a first voltage and a second voltage to the first electrode and the second electrode. During a time from when the ejection of the ink from the ejection opening is started to when the ink is divided into at least two ink drops during the ink ejection, the voltage controller applies the first voltage. Immediately after this time, the voltage controller applies the second voltage which has the same polarity as the first voltage and whose absolute value is smaller than that of the first voltage.

Another way of overcoming this problem is discussed in, for example, Japanese Unexamined Patent Application Publication No. 2002-307725. This document discusses an inkjet recording apparatus that records an image by discharging recording liquid drops, such as ink drops, onto a recording medium. The inkjet recording apparatus discussed in this document (related example 2) is a liquid discharging recording apparatus that records an image by discharging recording liquid drops onto a recording medium, and that includes a blowing-out unit and an air sucking unit. The blowing-out unit blows out air to a recording area. The air sucking unit is disposed opposite to the blowing-out unit with the recording area being disposed therebetween, and sucks air.

However, the first related example and the second related example make use of a printing method (what is called an "XY printing method") in which a print head is translationally moved in a main scanning operation, and a print object is moved in a sub-scanning operation, the main scanning operation and the sub-scanning operation being perpendicular to each other. In this printing method, since the print head is moved through a distance corresponding to the width of the print object, a mist adsorbing mechanism needs to be provided in an entire movement range of the print head.

The movement of the print head in the main scanning operation is a reciprocating movement. Therefore, a scattered state of mist during the reciprocating movement of the print head in a forward path of the print head differs from a scattered state of mist during the reciprocating movement of the print head in a return path of the print head. Consequently, in each of the first and second related examples, the mist adsorbing mechanism may not function effectively. As a result, the mist of ink drops generated during the printing cannot be reliably adsorbed, thereby staining peripheral portions by the mist.

SUMMARY OF THE INVENTION

The problem to be solved is that the related inkjet printing device makes use of a printing method (what is called an "XY printing method") in which a print head is translationally moved in a main scanning operation, and a print object is moved in a sub-scanning operation, the main scanning operation and the sub-scanning operation being perpendicular to each other. Therefore, a scattered state of mist in a forward path of the print head differs from that in a return path of the print head. Consequently, the mist adsorbing mechanism used in the related printing device may not reliably adsorb the mist of ink drops generated during the printing, as a result of which peripheral portions may be stained by the mist. As a result, when such a printing device is mounted to an optical disc apparatus, for example, the mist adheres to and stains an optical system or a movable section of an optical pickup. This makes it difficult to read out and write an information signal, thereby deteriorating recording/reproduction performance.

According to an embodiment of the present invention, there is provided a disc recording and/or reproducing apparatus including a disc mounting unit to which a disc recording medium is removably mounted, the disc mounting unit rotating the disc recording medium; a print head which discharges an ink drop towards a label surface of the disc recording medium that is rotationally driven by the disc mounting unit; and a mist attracting unit which, by applying a voltage, attracts mist of the ink drop discharged from the print head, the mist attracting unit provided near the disc recording medium mounted to the disc mounting unit.

According to another embodiment of the present invention, there is provided a mist adsorbing method of a disc recording and/or reproducing apparatus. The method includes the step of applying a voltage to a mist attracting unit, disposed near a rotationally driven disc recording medium, to apply the voltage to a mist and an ink drop discharged towards a label surface of the disc recording medium, thereby attracting the mist to the mist attracting unit.

The ink attracting unit may have an electrode plate to which a predetermined voltage is applied. In this case, the electrode plate attracts a mist of ink drop discharged from the print head that discharges the ink drop, so that the mist of ink drop is adhered to a surface of the electrode plate. This makes it possible to collect the mist of ink drop.

It is desirable that the electrode plate be disposed downstream from an ink discharging unit of the print head in a direction of rotation of the disc recording medium.

A disc accommodating unit for accommodating the disc recording medium may be defined as a ground potential.

A voltage may be applied to the electrode plate so that the strength of an electric field generated between the electrode plate and the disc accommodating unit is at least 200 kV/m.

The electrode plate may be disposed above the ink discharging unit.

The electrode plate may include a first electrode plate, facing a label-surface side of the disc recording medium, and a second electrode plate, facing an information-recording-surface side opposite to the label surface.

The electrode plate may be an electrode plate facing a radial-direction outer side of the disc recording medium. The electrode plate facing the radial-direction outer side may be curved in correspondence with the outer peripheral surface of the disc recording medium.

According to a disc recording and/or reproducing apparatus having a label printing function according to an embodiment of the present invention and a printing method of printing onto a label surface of a disc recording medium according to another embodiment of the present invention, an electric field generated by applying a predetermined voltage to the mist attracting unit causes mist of ink drops to be attracted to the mist attracting unit. This makes it possible to prevent nearby devices from becoming stained by the mist. For example, it is possible to prevent the mist from adhering to and staining, for example, a lens or a movable section of an optical pickup, thereby making it possible to prevent the performance of recording/reproducing an information signal from becoming deteriorated.

BRIEF DESCRIPTION OF THE DRAWINGS

FIG. 12 illustrates a state in which an ink drop is discharged from the print head of the printing device of the optical disc apparatus representing the disc recording and/or reproducing apparatus according to the first embodiment of the present invention, with FIG. 12A illustrating a state in which the disc recording medium is not rotated and FIG. 12B illustrating a state in which the disc recording medium is rotationally driven;

DESCRIPTION OF THE PREFERRED EMBODIMENT

A mist attracting unit which, by applying a predetermined voltage, attracts a mist of ink drops discharged from a print head is provided. By providing the mist attracting unit, a disc recording and/or reproducing apparatus and a mist adsorbing method that can prevent the mist from adhering to and staining, for example, a lens or a movable section of an optical pickup and that can prevent a recording/reproducing performance of an information signal from being deteriorated are realized using a simple structure.

FIGS. 1 to 27 illustrate exemplary forms of the present invention. The exemplary forms of the present invention will hereunder be described with reference to the attached drawings.

FIGS. 1 to 10 illustrate an optical disc apparatus 1 representing a disc recording and/or reproducing apparatus according to a first embodiment of the present invention. The optical disc apparatus 1 is a recording/reproducing apparatus provided with a tray printing function. The optical disc apparatus 1 is capable of recording (writing) a new information signal onto an information recording surface of, for example, an optical disc, a magneto-optical disc, or a magnetic disc; or reproducing (reading out) a previously recorded information signal from the information recording surface. The optical disc, the magneto-optical disc, and the magnetic disc are specific examples of disc recording media, which are print objects. Examples of optical discs include Compact Disc (CD) (trademark), Compact Disc Recordable (CD-R), Digital Versatile Disc (DVD) (trademark), Digital Versatile Disc Rewritable (DVD-RW), Blu-Ray Disc (BD) (trademark), and High Definition-Digital Versatile Disc (HD-DVD). In addition, the optical disc apparatus 1 is capable of printing visible information, such as characters, symbols, photographs, pictures, or patterns, onto a label surface of an optical disc 2, which is a specific example of a print surface.

However, the disc recording and/or reproducing apparatus according to the embodiment of the present invention is not limited to an optical disc apparatus capable of recording and reproducing information. It is obviously applicable to a disc recording apparatus capable of only recording an image signal, or to a disc reproducing apparatus capable of only reproducing an information signal. The disc recording medium is not limited to an optical disc on which a recording operation or a reproduction operation of an information signal is performed using laser light. Various types of disc recording media having external disc shapes, such as optical discs using near field light, magneto-optical discs using light and magnetism, and magnetic discs using only magnetism, may also be used as recording media.

Figure 1:
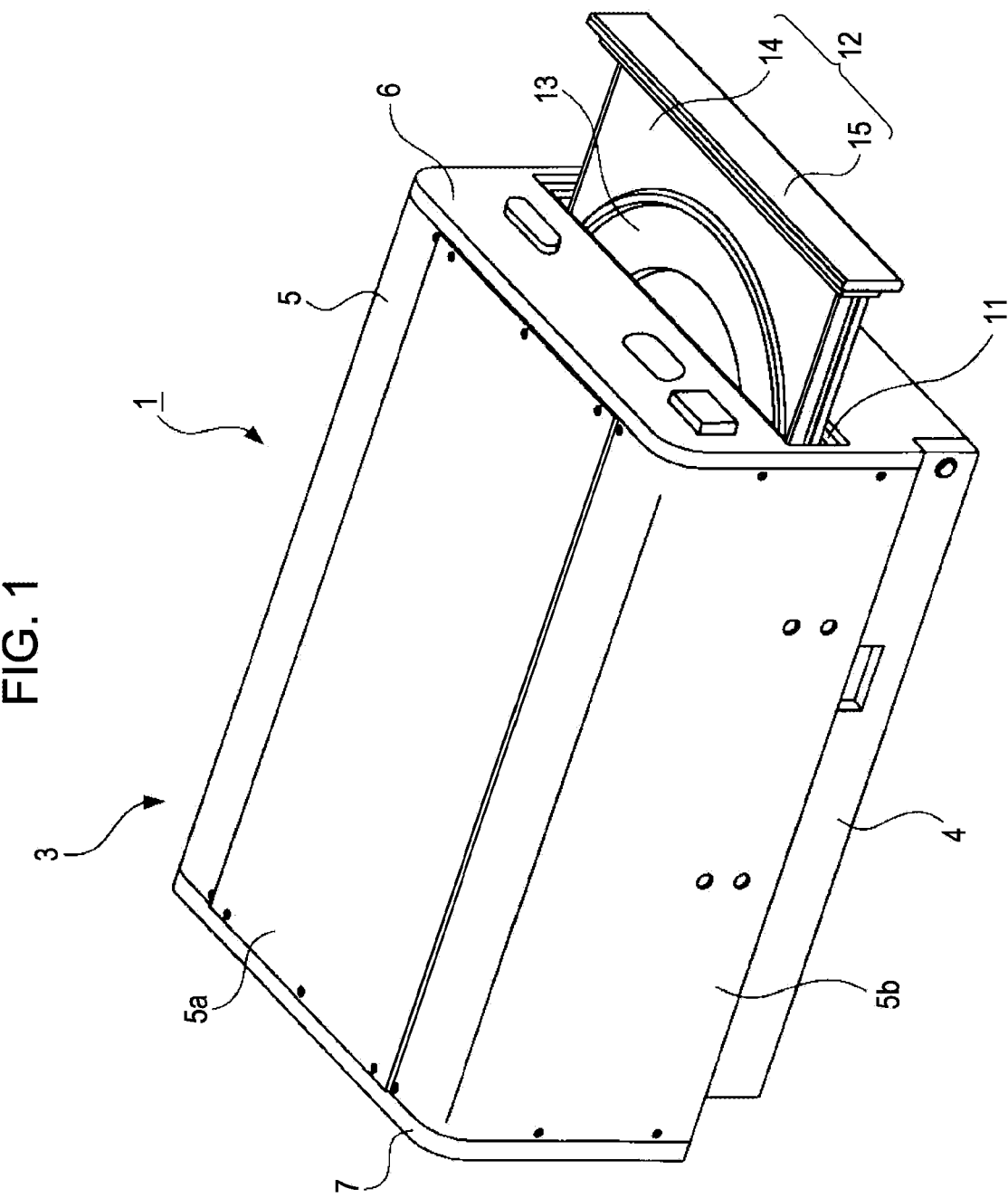
FIG. 1 is a perspective view of a disc-tray optical disc apparatus representing a disc recording and/or reproducing apparatus according to a first embodiment of the present invention, in which a disc tray is drawn out.
Figure 2:
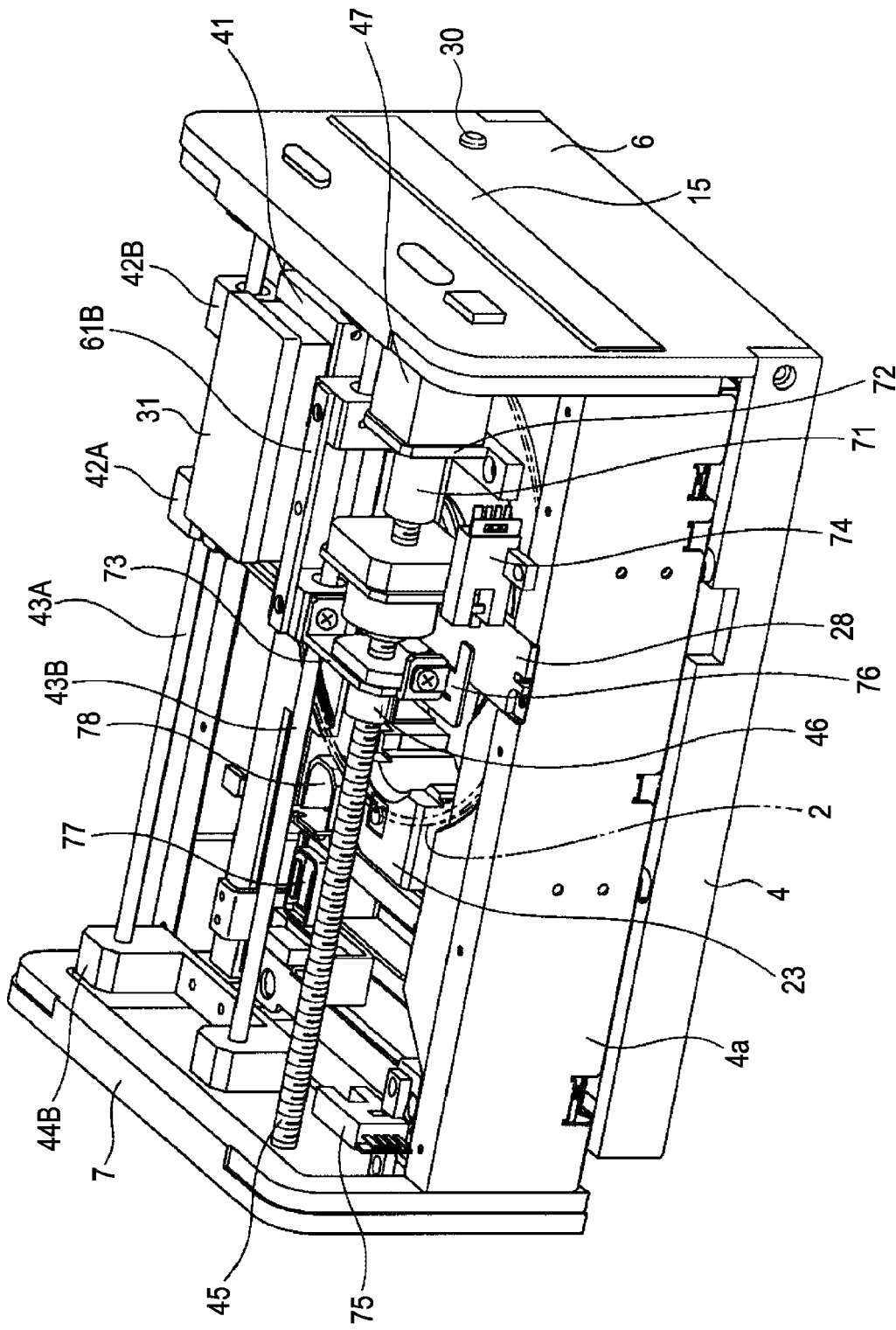
FIG. 2 is a perspective view of the optical disc apparatus representing the disc recording and/or reproducing apparatus according to the first embodiment of the present invention, in which an upper plate of a housing is removed.
Figure 3:
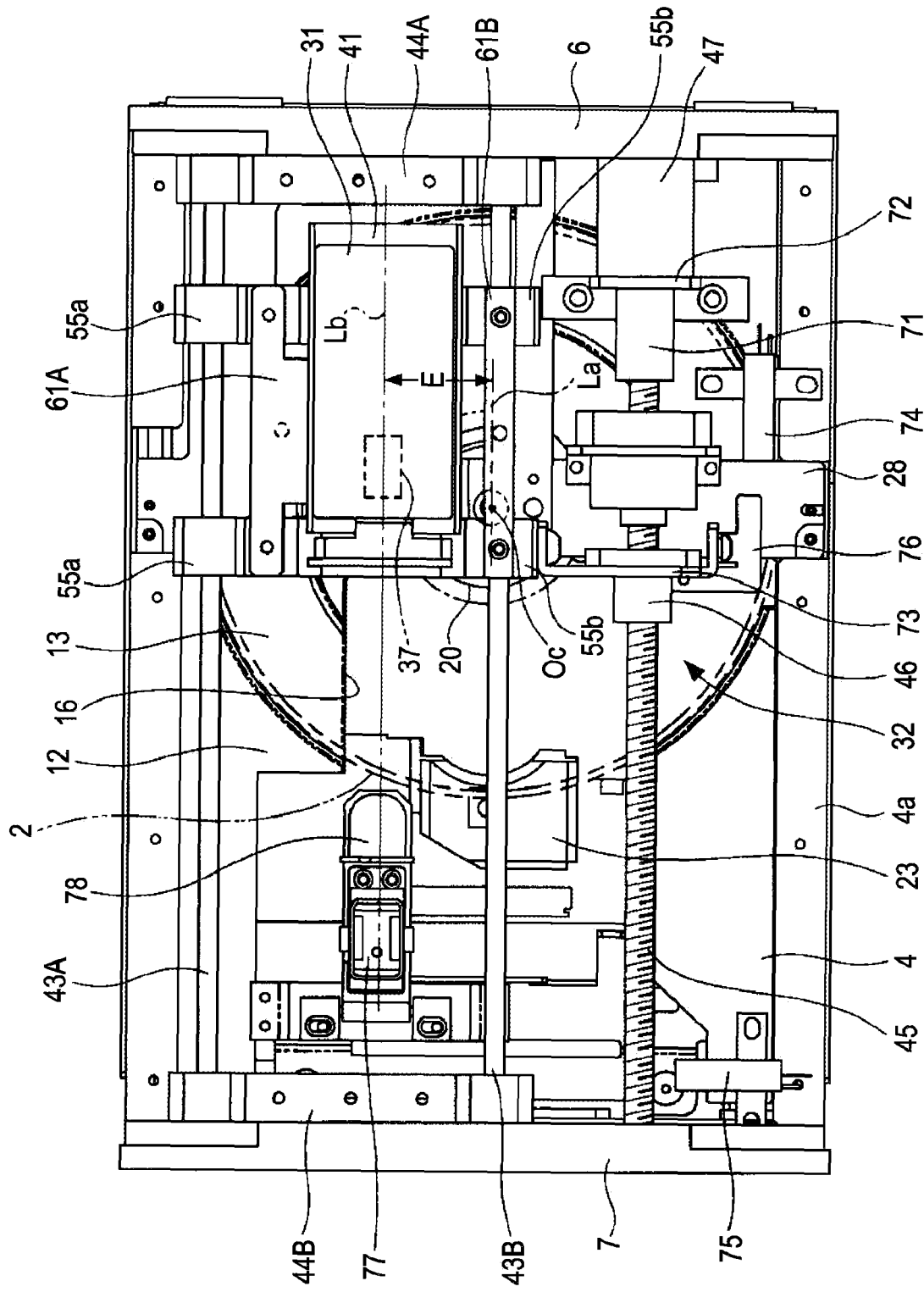
FIG. 3 is a plan view of the optical disc apparatus representing the disc recording and/or reproducing apparatus according to the first embodiment of the present invention, in which the upper plate of the housing is removed.

FIG. 1 is an external perspective view of the optical disc apparatus 1. FIG. 2 is a perspective view of the optical disc apparatus 1 in which an upper plate 5 of a housing 3 is removed. FIG. 3 is a plan view of the optical disc apparatus 1 in which the upper plate 5 is similarly removed. As shown in FIGS. 1 to 3, the optical disc apparatus 1 includes, for example, the housing 3, an apparatus body 8, and an input device (not shown). The housing 3 is a hollow container. The device body 8 is accommodated in the housing 3. The input device is, for example, a remote controller. An external device (not shown), such as an image display device or a sound output device, can be electrically connected to the optical disc apparatus 1. Information read out from an information recording section of the optical disc 2 can be indicated using, for example, an image or a voice. Examples of image display devices are a liquid crystal display device, an organic electro luminescent (EL) display, and a plasma display device. An example of sound output device is a speaker device.

The housing 3 of the optical disc apparatus 1 includes a rectangular base plate 4, an upper plate 5 (which covers the top side of the base plate 4), a front plate 6 (which covers the front side of the base plate 4), and a back plate 7 (which covers the back side of the base plate 4). Overall, the housing 3 is a hollow container. Side surface portions 4a and 4a are provided at respective sides of the base plate 4 of the housing 3 in a widthwise direction thereof. Each side surface portion 4a extends to a predetermined height in a longitudinal direction of the base plate 4. The upper plate 5 has a rectangular upper surface portion 5a and left and right side surface portions 5b and 5b, formed continuously with respective sides in a widthwise direction of the upper surface portion 5a and covering respective side surfaces. The upper plate 5 is mounted to the top portion of the base plate 4, and the side surface portions 5b and 5b are mounted to the respective side surface portions 4a and 4a by securing them to the respective side surface portions 4a and 4a with securing screws (not shown). A front cylindrical opening formed by the upper plate 5 and the base plate 4 is closed by the front plate 6, and a rear opening formed by the upper plate 5 and the base plate 4 is closed by the back plate 7. The front plate 6 and the back plate 7 are screwed to the base plate 4 and the upper plate 5 by securing screws (not shown).

A horizontally extending disc slot 11 is provided in substantially the central portion in a height direction of the front plate 6. A disc tray 12 is mounted to the disc slot 11 so that it can be moved in and out of the disc slot 11. The disc tray 12 selectively conveys the optical disc 2 on a disc accommodating unit 13 from a disc removal position (situated outside the housing 3) and a disc mounting position in the housing 3 (where an information signal is recorded (written) onto or is reproduced (read out) from the optical disc 2). The disc tray 12 includes a tray body 14 and a covering plate 15. The tray body 14 is formed of a plate member having a planar rectangular shape that is slightly larger than the optical disc 2. The covering plate 15 is secured to one end in a longitudinal direction of the tray body 14. The disc accommodating unit 13 having a circular recess for accommodating the optical disc 2 is provided on the top surface (which is one of the planar surfaces) of the tray body 14.

A cutaway portion 16 for avoiding contact with a disc mounting unit (described later) is provided in the tray body 14. The cutaway portion 16 is a large cutaway portion extending from a short side of the disc tray 12 to the central portion of the disc accommodating unit 13. The covering plate 15 is integrally provided with a short side situated opposite to the cutaway portion 16 of the tray body 14. When the disc tray 12 moves to the disc mounting position, the covering plate 15 functions as a cover that closes the disc slot 11. The covering plate 15 has a horizontally long rectangular shape corresponding to the shape of the disc slot 11, and is movably fitted to the disc slot 11.

Figure 10:
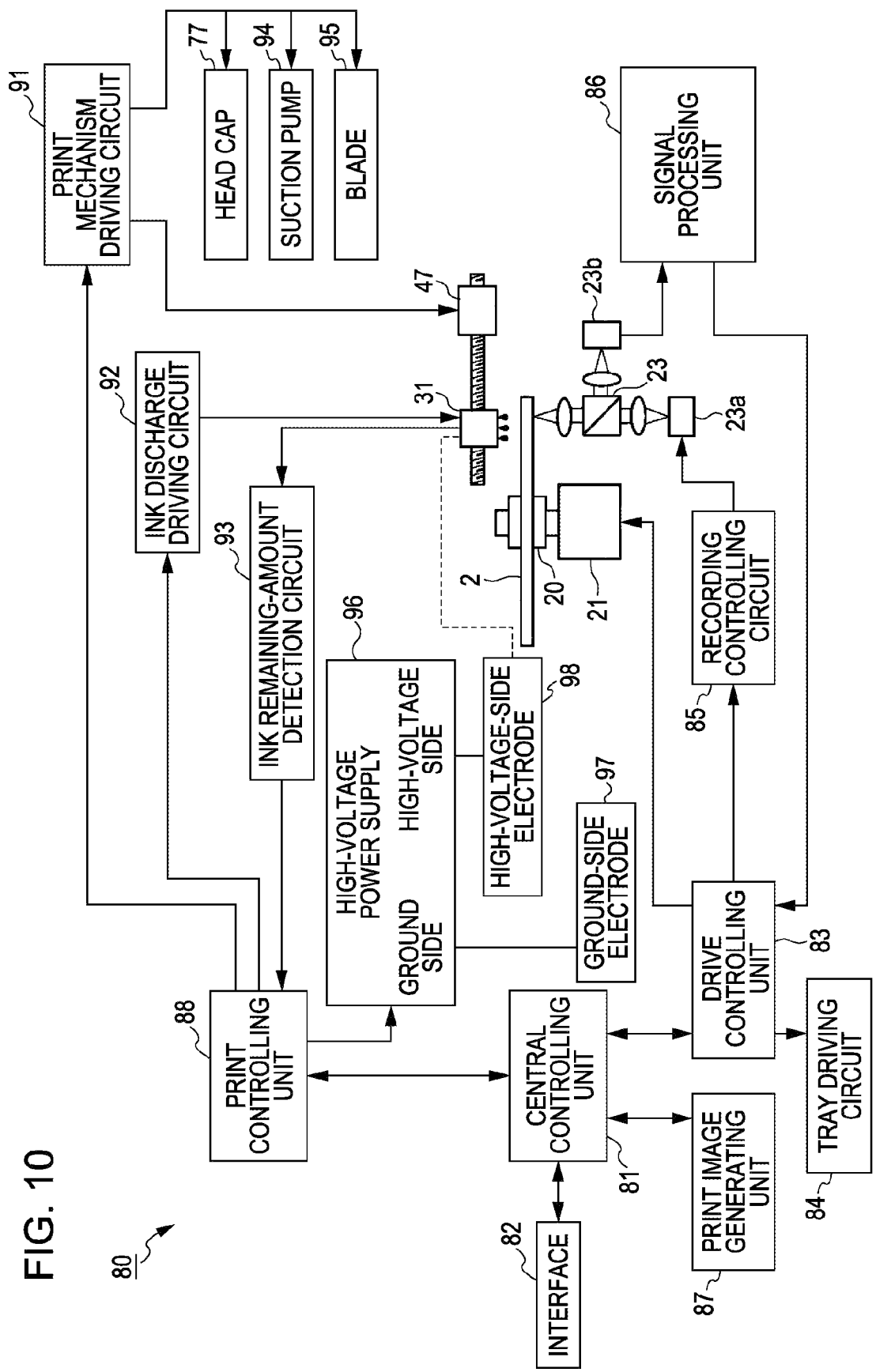
FIG. 10 is a block diagram of a schematic structure of a controlling unit of the optical disc apparatus representing the disc recording and/or reproducing apparatus according to the first embodiment of the present invention.

The apparatus body 8 of the optical disc apparatus 1 includes, for example, a disc drive device 9, a printing device 10, and a controlling device 80 (refer to FIG. 10). The disc drive device 9 records new information by writing an information signal to the information recording section of the optical disc 2 that is provided, and reproduces information previously recorded in the information recording section by reading out the information. The printing device 10 prints items onto, for example, a label surface of the provided optical disc 2 or a label sheet adhered to the label surface, and displays them. The items are related to, for example, information previously recorded in the information recording section or new information recorded in the information recording section, and are printed as visible information such as characters, numbers, photographs, pictures, or patterns. The controlling device drives and controls the disc drive device 9, the printing device 10, and, if necessary, other devices, to cause the disc drive device 9 to perform a predetermined recording/reproducing operation and other operations, and to cause the printing device 10 to perform a predetermined printing operation or other operations.

Figure 4:
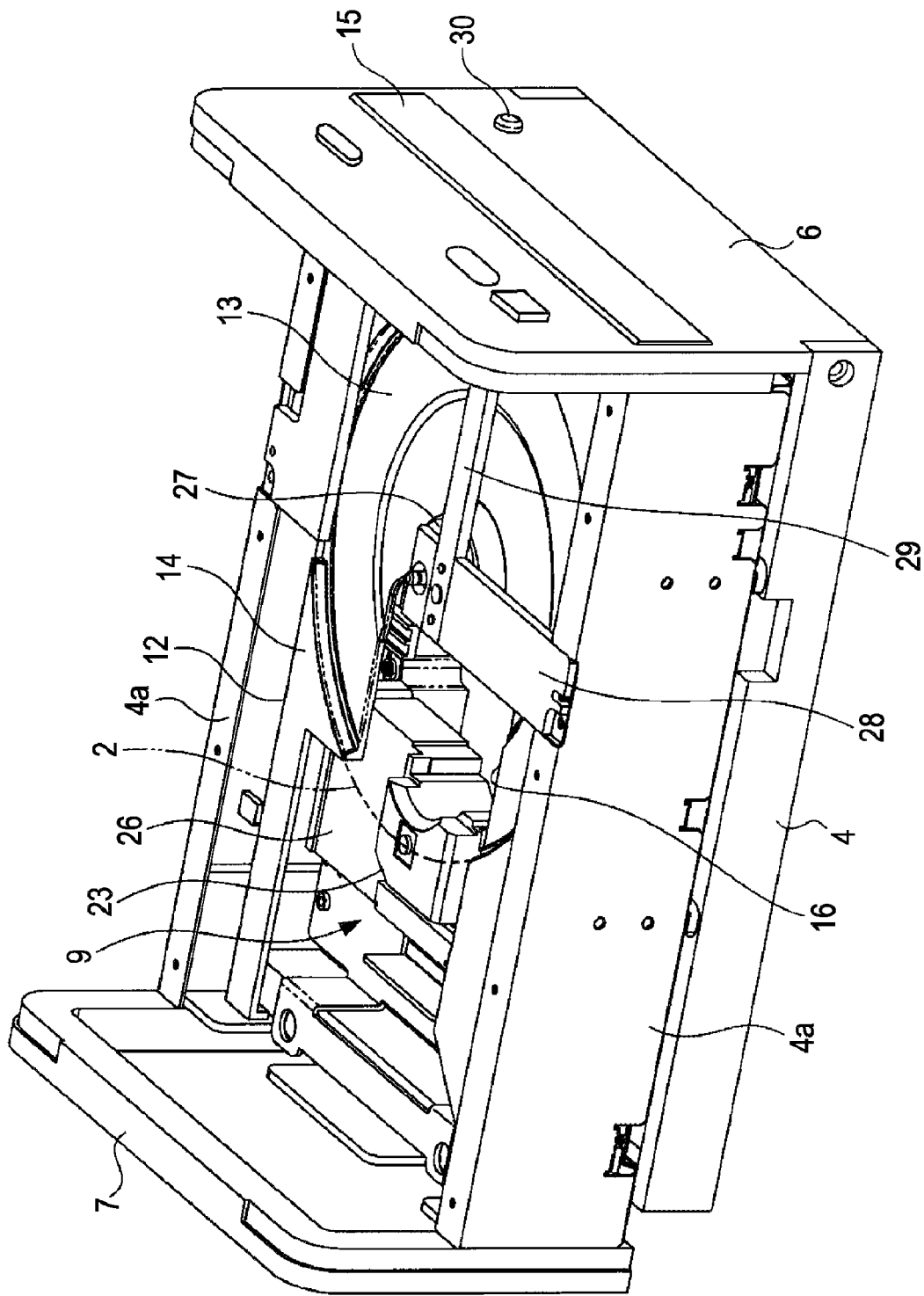
FIG. 4 is a perspective view showing a state in which a printing device is further removed from the optical disc apparatus shown in FIG. 2.
Figure 5:
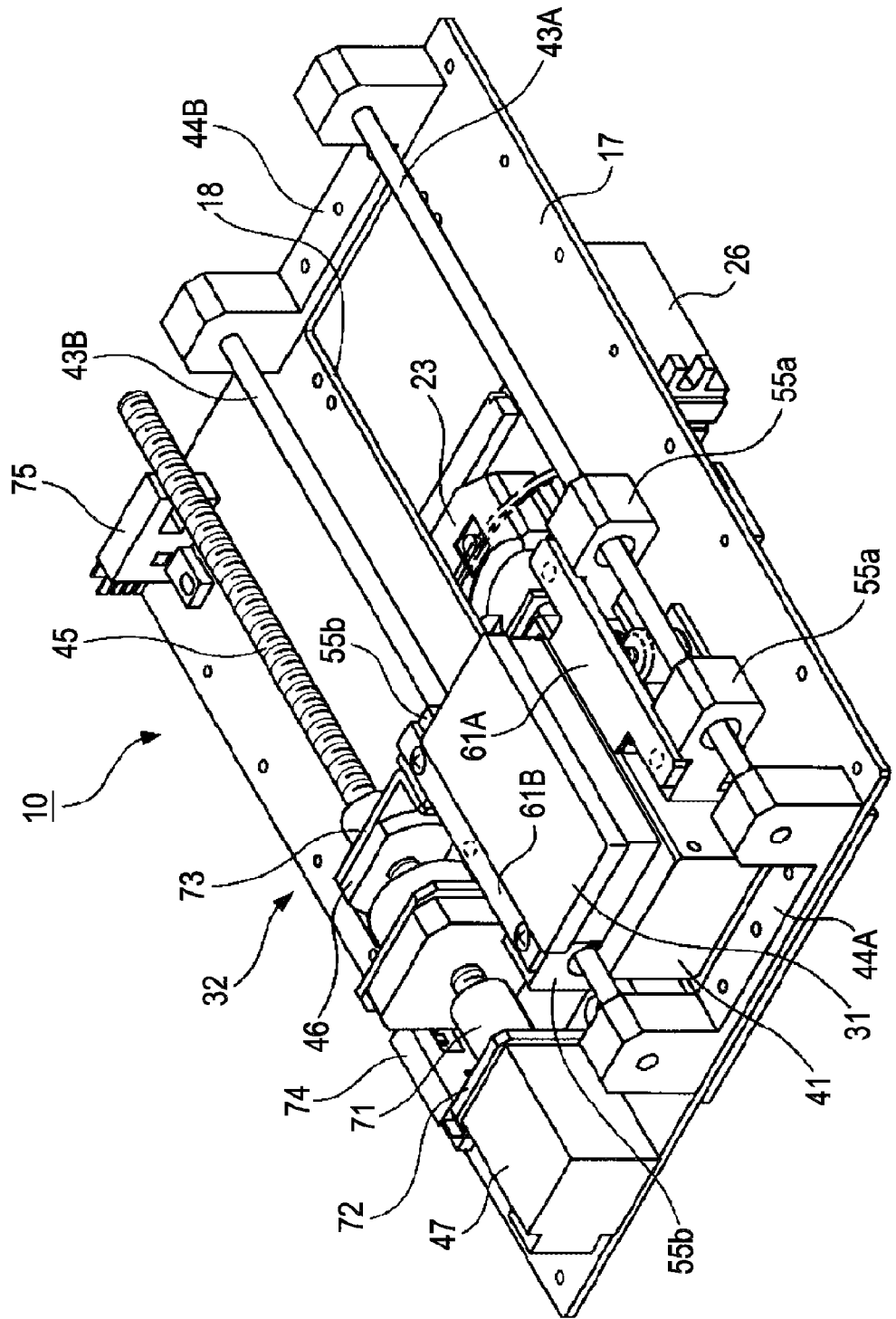
FIG. 5 is a perspective view of a first exemplary printing device of the optical disc apparatus representing the disc recording and/reproducing apparatus according to the first embodiment of the present invention.

FIG. 4 is a perspective view showing a state in which the printing device 10 is further removed from the optical disc apparatus 1 shown in FIG. 2. In the embodiment, the disc drive device 9 is disposed at a lower side in the housing 3, and the printing device 10 is disposed at an upper side in the housing 3. To realize this arrangement, a chassis plate 17 is disposed in the housing 3 so as to vertically partition a space in the housing 3. FIG. 5 is a perspective view showing a state in which the printing device 10 is mounted to the chassis plate 17. The chassis plate 17 is formed of a rectangular plate member that is slightly smaller than the base plate 4. A rectangular opening 18 extending in a longitudinal direction and having a predetermined width is formed in the chassis plate 17 so as to extend through the front and back surfaces of the chassis plate 17. The printing device 10 is mounted to an upper surface (which is one surface) of the chassis plate 17, and the disc drive device 9 is disposed so as to be separated from a lower surface (which is another surface) of the chassis plate 17 by a predetermined gap.

Since the disc drive device 9 has a structure that is similar to those of disc drive devices generally used in this type of optical disc apparatus, the structure, etc., of the disc drive device 9 will be simply described. The disc drive device 9 includes, for example, a disc rotating mechanism, a mounting unit raising-and-lowering mechanism, an optical pickup 23, a pickup moving mechanism, and a drive control circuit. The disc rotating mechanism includes a disc mounting unit 20 (see FIG. 3) to which the optical disc 2 is removably mounted. The mounting unit raising-and-lowering mechanism raises and lowers the disc mounting unit 20 to chuck and unchuck the optical disc 2. The optical pickup 23 is a specific example of an optical pickup device that records an information signal onto or reproduces it from the optical disc 2. The pickup moving mechanism moves the optical pickup 23 in a radial direction of the optical disc 2. The drive control circuit drives and controls these mechanisms, etc.

The disc rotating mechanism includes, for example, a spindle motor and a turntable. The spindle motor is a stepping motor or a DC servomotor. The turntable is secured to a rotating shaft of the spindle motor. The turntable forms the disc mounting unit 20 to which the optical disc 2 is removably mounted. When the disc tray 12 is conveyed to the disc mounting position, the spindle motor to which the turntable is mounted is disposed at substantially the central portion of the disc accommodating unit 13. The turntable has a disc fitting portion, which is removably fitted to a center hole of the optical disc 2, and a disc mounting portion, which supports the peripheral portion of the center hole.

The mounting unit raising-and-lowering mechanism raises and lowers the disc rotating mechanism at the disc mounting position to mount the optical disc 2 and dismount the optical disc 2 from the turntable. The mounting unit raising-and-lowering mechanism includes, for example, a motor base, a cam mechanism, and an electric motor. The motor base has the spindle motor mounted thereto, and is swingably supported by the base plate 4 of the housing 3. The cam mechanism swings the motor base. The electric motor raises and lowers the spindle motor by operating the cam mechanism. A chucking plate 27 is disposed at an upper side of the spindle motor. The chucking plate 27 is attracted by a magnet built in the turntable, and holds down from above the optical disc 2 raised by a raising-and-lowering operation of the spindle motor. The optical disc 2 is interposed between the chucking plate 27 and the turntable to prevent the optical disc 2 from becoming dislodged from the turntable and/or from sliding on the turntable.

The chucking plate 27 is rotatably supported by a plate supporting plate 28 secured to an upper edge of the side surface portion 4a of the base plate 4. The plate supporting plate 28 is formed of a rectangular plate member. The chucking plate 27 is rotatably supported at one side of the plate supporting plate 28 in a longitudinal direction thereof. The plate supporting plate 28 is mounted in a cantilever manner by securing the other side of the supporting plate 28 in the longitudinal direction thereof to the upper edge of the side surface portion 4a of the base plate 4. The plate supporting plate 28 is supported by an accessory plate 29 so as not to flex easily. The position of the chucking plate 27 that is supported by the plate supporting plate 28 corresponds to the disc mounting position where the optical pickup 23 records (writes) an information signal onto and reproduces (reads out) the information signal from the optical disc 2.

The disc tray 12 can be conveyed between the disc mounting position and the disc removal position (situated outside the housing 3) by a tray conveying mechanism. Since the tray conveying mechanism has a structure that is similar to those generally used in this type of optical disc apparatus, the structure, etc., of the tray conveying mechanism will be simply described. The tray conveying mechanism includes, for example, a rack, provided at the disc tray 12, a pinion, which engages the rack, and an electric motor, which rotationally drives the pinion. When the pinion is rotated by driving the electric motor, rotational force thereof is transmitted to the rack. Therefore, in accordance with the direction of rotation of the electric motor, the disc tray 12 is conveyed from the disc mounting position to the disc removal position, or from the disc removal position to the disc mounting position.

When the tray conveying mechanism operates, the optical pickup 23 of the disc drive device 9, in particular, a pickup lens and surrounding portions thereof (facing the information recording section of the optical disc 2) enter the cutaway portion 16 of the disc tray 12. When the optical disc 2 placed on the disc accommodating unit 13 of the disc tray 12 is mounted to the turntable and is raised by a predetermined amount, the optical pickup 23 moves to the lower side of the optical disc 2. This makes it possible for the optical pickup 23 to write an information signal to and read out the information signal from the information recording section of the optical disc 2. Reference numeral 30 shown in FIG. 4 denotes an eject button for causing the tray conveying mechanism to perform a discharging operation.

Therefore, when the disc tray 12 is conveyed to the disc mounting position, the mounting unit raising-and-lowering mechanism raises the motor base, to move the spindle motor upward. At this time, the disc fitting portion of the turntable is fitted to the center hole of the optical disc 2, and the optical disc 2 is raised upward from the disc accommodating unit 13 by a predetermined distance. The chucking plate is attracted by the magnet built in the turntable, so that the optical disc 2 is interposed between the chucking plate and the turntable. When the motor base is lowered by operating the mounting unit raising-and-lowering mechanism in the opposite direction, the disc mounting portion of the turntable moves downward and out of the center hole of the optical disc 2. This causes the optical disc 2 to move away from the turntable and to be placed on the disc accommodating unit 13.

The optical pickup 23 includes, for example, a photodetector, an objective lens, and a biaxial actuator. The biaxial actuator causes the objective lens to face the information recording section of the optical disc 2. The photodetector of the optical pickup 23 includes a semiconductor laser, which is a light source that emits a light beam, and a light-receiving element, which receives a returning light beam. In the optical pickup 23, a light beam is emitted from the semiconductor laser, and is converged by the objective lens to irradiate the information recording section of the optical disc 2. In addition, a returning light beam reflected by the information recording section is received by the photodetector. This makes it possible for the optical pickup 23 to record (write) an information signal to the information recording section and reproduce (read out) the information signal previously recorded on the information recording section.

The optical pickup 23 is mounted to a slide member 26, and moves together with the slide member 26. Two guide shafts (not shown) are parallel to each other and are swingably inserted into the slide member 26. The two guide shafts are disposed substantially parallel to a principal surface, that is, the front surface of the information recording section of the optical disc 2, and extends in the direction of movement of the disc tray 12. The slide member 26 that is swingably held by the two guide shafts can be moved in a radial direction of the optical disc 2 by the pickup moving mechanism.

As the pickup moving mechanism, for example, a feed screw mechanism which is a combination of a feed screw and a feed nut may be used. However, the pickup moving mechanism is not limited to a feed screw mechanism, so that other mechanisms, such as a rack-pinion mechanism, a belt conveying mechanism, and a wire conveying mechanism, may be used. During movement of the slide member 26 moved by the pickup moving mechanism, the optical pickup 23 records an information signal onto and reproduces it from the information recording section of the optical disc 2.

As shown in FIGS. 2 and 3, the printing device 10 of the optical disc apparatus 1 includes, for example, a print head 31, a head moving mechanism 32, a distance detecting unit 33 (not shown), a cleaning mechanism 34 (not shown), and a print-etc. control circuit (not shown). The print head 31 has an ink tank accommodated therein. The head moving mechanism 32 moves the print head 31 along a print surface of the optical disc 2. The distance detecting unit 33 detects the distance between the print head 31 and the print surface. The cleaning mechanism 34 cleans, for example, a detecting element of the distance detecting unit 33. The print-etc. control circuit controls the operations of, for example, the print head 31, the head moving mechanism 32, the distance detecting unit 33, and the cleaning mechanism 34.

Figure 9:
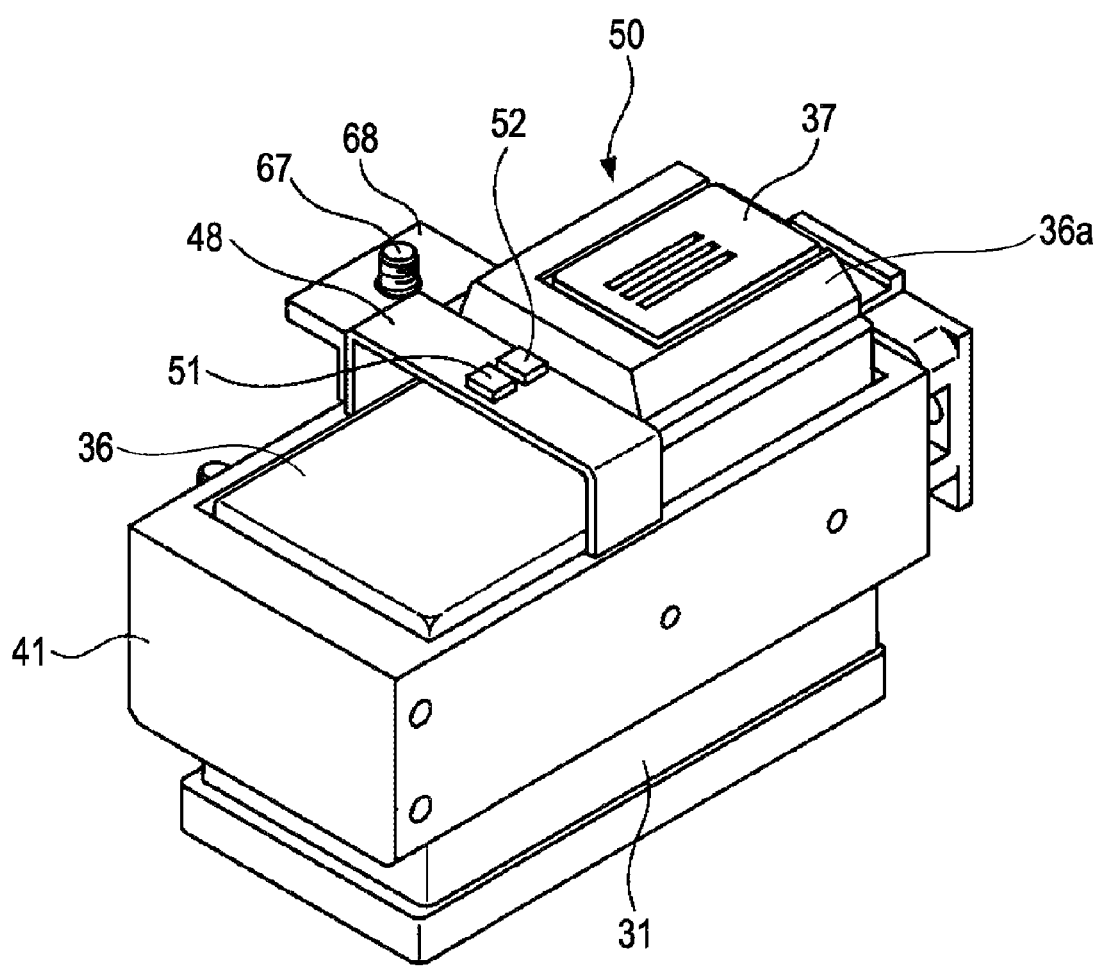
FIG. 9 is a perspective view, as seen from an ink discharging unit side, of the print head assembly of the printing device of the optical disc apparatus representing the disc recording and/or reproducing apparatus according to the first embodiment of the present invention.

The print head 31 has, for example, the structure shown in FIG. 9. FIG. 9 shows the inkjet print head 31 used in label printing and where an ink tank unit and an ink discharge unit are integrally formed.

The print head 31 shown in FIG. 9 includes one hollow head housing 36. The interior of the head housing 36 accommodates an ink tank and an ink discharging mechanism (not shown). The ink tank has an accommodating portion for one color (for example, black) or accommodating portions for two or more colors (such as three colors, magenta, cyan, and yellow). The ink discharging mechanism individually discharges respective colors from nozzles. The head housing 36 is formed by providing a rectangular parallelepiped projection 36a at substantially half of one surface of a rectangular parallelepiped member in a longitudinal direction. An ink discharging unit 37 for discharging ink is provided at substantially the central portion of the projection 36a. The ink discharging unit 37 is provided with nozzles formed by many holes having very small diameters (that is, a few hundred holes having diameters of from a few μ to a few tens of μ). These nozzles are arranged in columns, with the number of columns being the same as the number of colors used. For example, for a print head using three colors, magenta, cyan, and yellow, three columns of nozzles are provided.

The print head 31 having such a structure is formed so that it can be moved along the print surface of the optical disc 2 by the head moving mechanism 32. The head moving mechanism 32 includes, for example, a head holder 41, a head slider 42, two head guide shafts 43A and 43B, two guide bearings 44A and 44B, a feed screw shaft 45, a feed nut 46, and a head conveying motor 47. The head holder 41 holds the print head 31. The head slide 42 movably supports the head holder 41. The two head guide shafts 43A and 43B movably support the head slider 42. The two guide bearings 44A and 44B support the two head guide shafts 43A and 43B that are secured to the two guide bearings 44A and 44B. The feed screw shaft 45 and the feed nut 46 move the print head 31. The head conveying motor 47 rotationally drives the feed screw shaft 45.

The head holder 41 is formed of a square frame member to which the print head 31 is fitted. FIG. 9 obliquely shows, from the ink discharging unit 37 side of the print head 31, a print head assembly 50 formed by fitting the print head 31 to the head holder 41. When the print head 31 is assembled, the ink discharging unit 37 is passed through the head holder 41, and protrudes downward from a lower surface 41a, which is one surface of the head holder 41. A U-shaped mounting bracket 48 having the form of a gate protruding downward is provided at the lower surface 41a of the head holder 41.

Two distance detecting sensors 51 and 52, which are specific examples of the distance detecting unit 33, are disposed horizontally in parallel at and secured to substantially the central portion of the lower surface of the mounting bracket 48. The first distance detecting sensor 51 and the second distance detecting sensor 52 detect the distance between the surface of the ink discharging unit 37 of the print head 31 and the print surface of the optical disc 2 (that is mounted to the disc mounting unit 20 and is rotated). As the first distance detecting sensor 51 and the second distance detecting sensor 52, any distance detecting sensors may be used as long as they detect a distance S between the ink discharging unit 37 and the print surface of the optical disc 2. However, it is desirable that they be reflecting photo interrupters.

A photo interrupter is an optical sensor in which a light-emitting diode (LED) and a photodiode form a set, and in which infrared light is primarily used. The photo interrupter is available as a reflection type and a transmission type. In the embodiment of the present invention, the reflection type may be used. The reflection-type photo interrupter can precisely detect the distance to an object when light is emitted from the LED; reflected light, etc., is detected by the photodiode; and reflectivity of light of the object is examined. A specific example of the reflection-type photo interrupter is, for example, a reflection-type photo interrupter SG-105 manufactured by Kodenshi Corp. In the reflection-type photo interrupter SG-105, a light-emitting element and a light-receiving element are disposed in the same plane, and the distance to an object can be detected by reflected light of the detected object.

The two distance detecting sensors 51 and 52 are disposed inwardly of the ink discharging unit 37 of the print head 31 in a radial direction of the optical disc 2 and horizontally side by side at an upstream side in the direction of rotation of the optical disc 2. The two distance detecting sensors 51 and 52 are disposed at the upstream side in the direction of rotation of the optical disc 2 to make it difficult for mist, floating in the air as a result of a portion of ink being discharged from the ink discharging unit 37, from adhering to the detection portions of the distance detecting sensors. In this embodiment, the two distance detecting sensors 51 and 52 are disposed on a line extending along substantially the central portion of the ink discharging unit 37, and are disposed towards the rotation center of the optical disc 2.

The print surface of the optical disc 2 is a label surface 2a, which is one surface of the optical disc 2. When a label sheet 53 is adhered to the label surface 2a of the optical disc 2, a surface 53a of the adhered label sheet 53 becomes the print surface. The head holder 41 to which the print head 31 is assembled is supported by the head slider 42 so as to be relatively movable.

Figure 6:
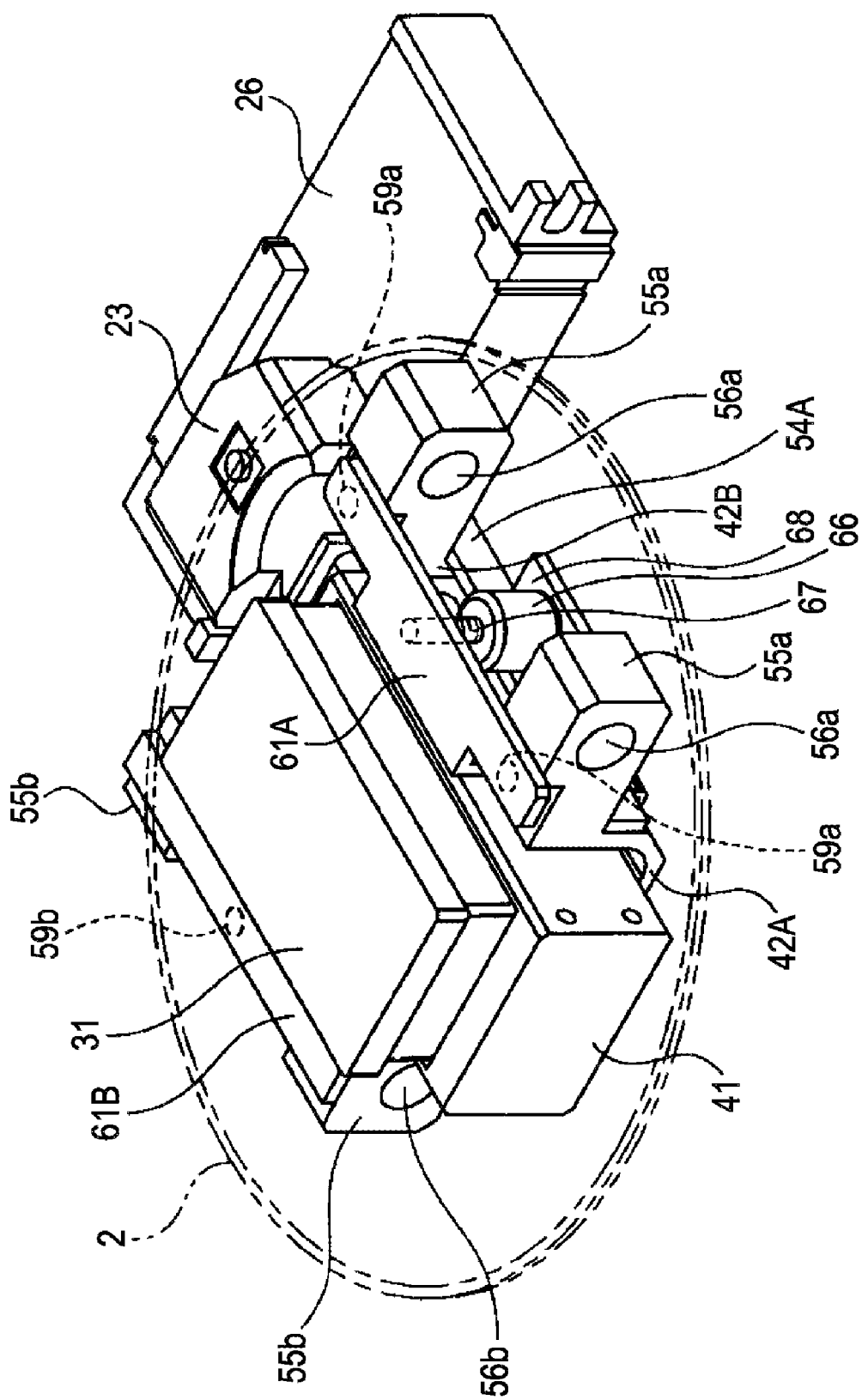
FIG. 6 is a perspective view illustrating a positional relationship between an optical disc, an optical pickup of a disc drive device, and a print head of the printing device of the optical disc apparatus representing the disc recording and/or reproducing apparatus according to the first embodiment of the present invention.
Figure 7:
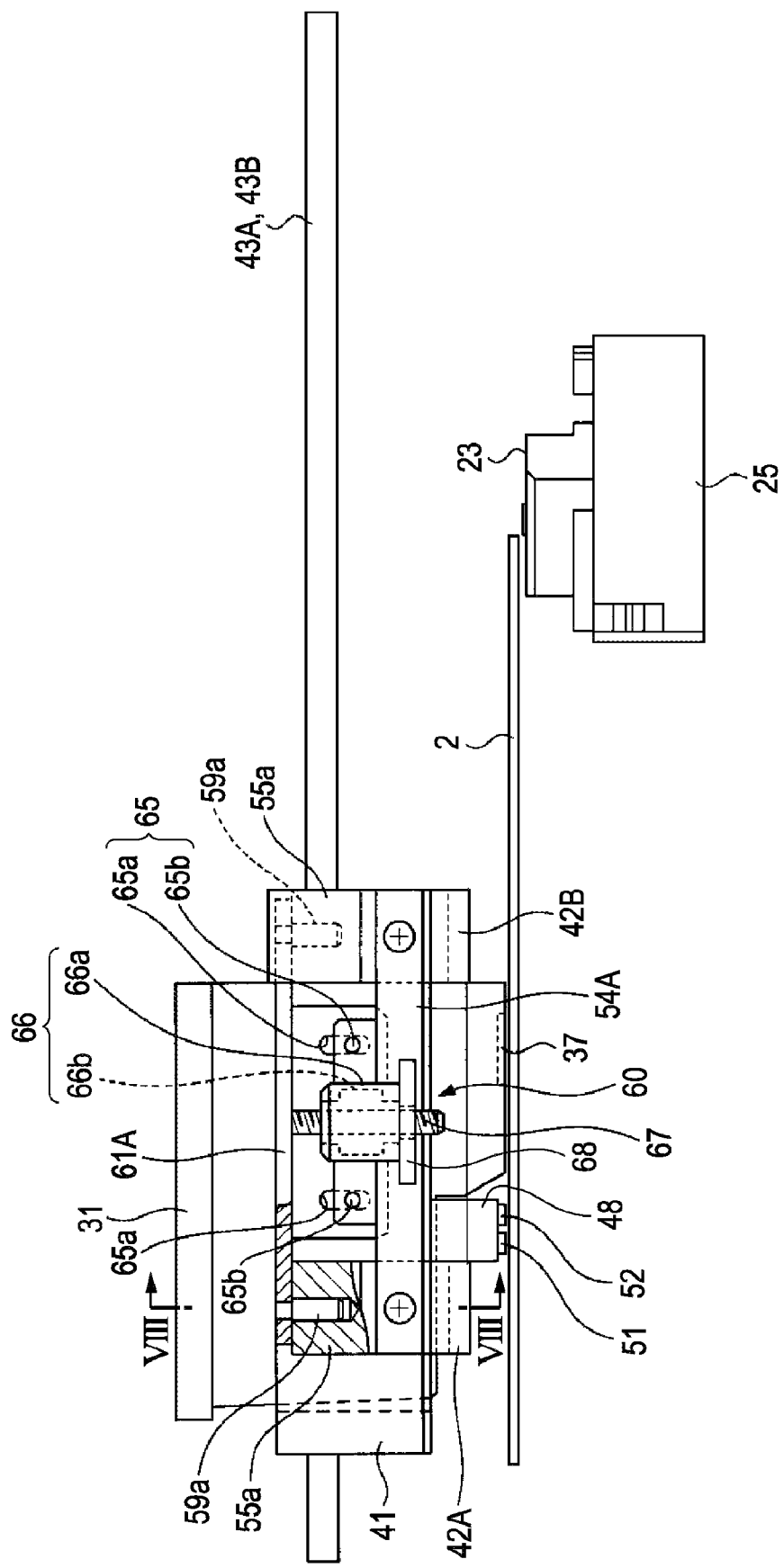
FIG. 7 is a side view illustrating the positional relationship between the optical disc, the optical pickup of the disc drive device, and the print head of the printing device of the optical disc apparatus representing the disc recording and/or reproducing apparatus according to the first embodiment of the present invention.

FIG. 6 illustrates the head holder 41 and the head slider 42 supporting the head holder 41. FIG. 7 illustrates the relationship between the positions of the print head 31, the optical disc 2, and the optical pickup 23 in a height direction. As shown in FIGS. 6 and 7, the optical disc 2 is provided below the head slider 4 and apart from the head slider 42 so as to face the head slider 42. Here, the optical disc 2 is mounted to the turntable (not shown) of the disc rotating mechanism of the disc drive device 9 disposed at the opposite side of the chassis plate 17. The optical pickup 23 can move towards and away from the turntable in a direction perpendicular to a direction of a principal surface of the optical disc 2.

The head slider 42 includes a front member 42A and a rear member 42B, and a right linking member 54A and a left linking member 54B. The front member 42A and the rear member 42B are disposed apart from each other by a predetermined interval in a front-back direction (a longitudinal direction) of the print head 31. The right linking member 54A and the left linking member 54B are disposed apart from each other by a predetermined interval in a left-right direction, and link the front member 42A and the rear member 42B. The front member 42A and the rear member 42B extend upward so as to be spaced by a predetermined interval in the left-right direction that crosses the longitudinal direction. First bearings 55a and 55a protruding sideways are provided at ends of one of the upwardly protruding sides, and second bearings 55b and 55b protruding sideways in the opposite direction are provided at ends of the other upwardly protruding side.

The first bearings 55a and 55a have first bearing holes 56a and 56a, respectively, with the two first bearing holes 56a and 56a being set coaxially on the same line. Similarly, the second bearings 55b and 55b have second bearing holes 56b and 56b, respectively, with the two second bearing holes 56b and 56b being set coaxially on the same line. Bearing members 58 are mounted to the first bearing holes 56a and the second bearing holes 56b, and are secured thereto by, for example, press-fitting. Two guide shafts 43A and 43B are slidably inserted into these bearing members 58.

Figure 8:
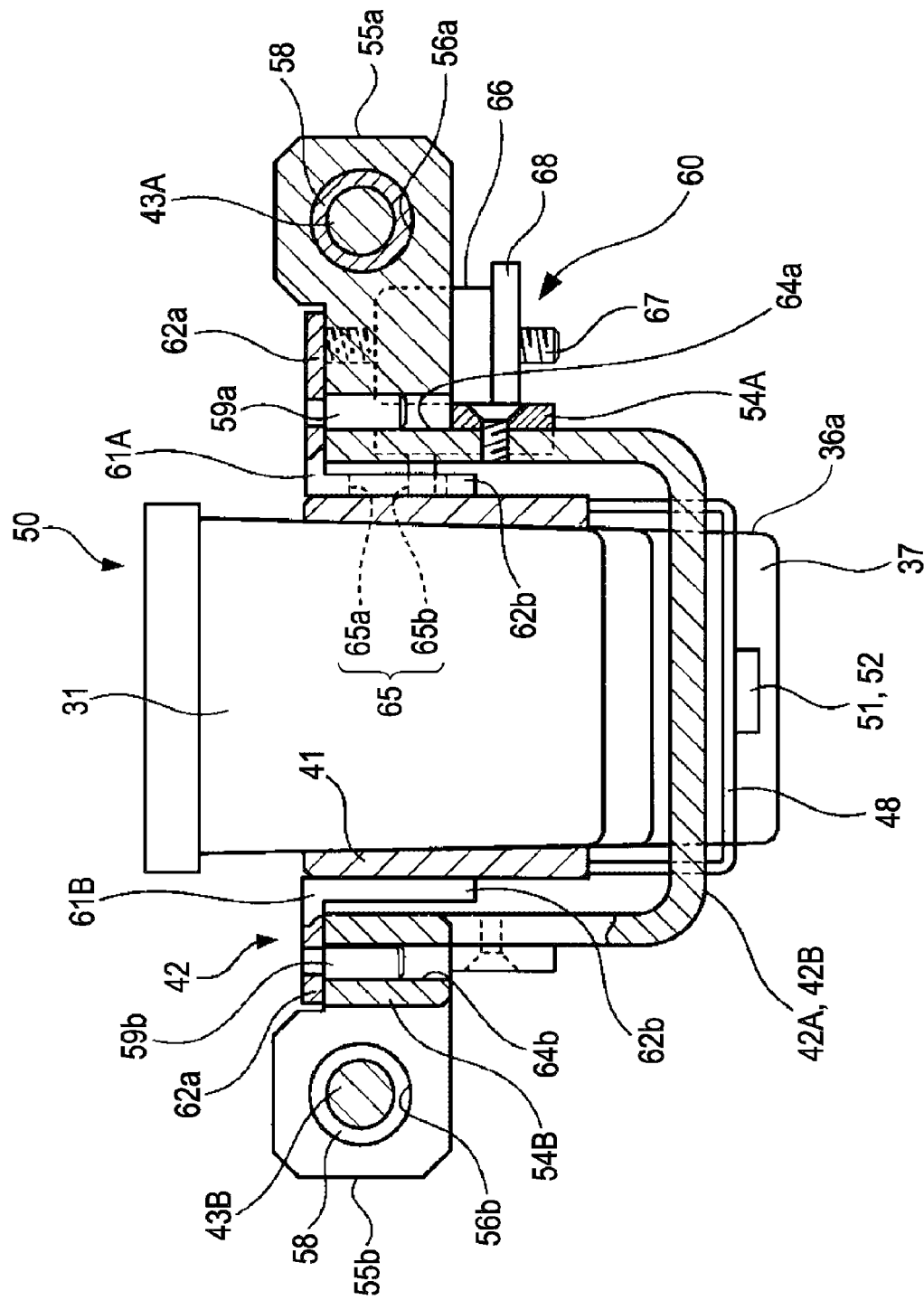
FIG. 8 illustrates a print head assembly that is sectioned along line VIII-VIII shown in FIG. 7.

FIG. 8 shows a state in which the print head 31 is held by the head holder 41, and a state in which the head holder 41 is relatively movably supported by the head slider 42 through three guide pins, that is, the guide pins 59a, 59a, and 59b. A first supporting plate 61A is mounted to one long-side portion of the head holder 41, and a second supporting plate 61B is mounted to another long-side portion of the head holder 41. The two supporting plates 61A and 61B each have an upper surface portion 62a and a side surface portion 62b. When ends of the upper surface portions 62a and the respective side surface portions 62b are formed continuously, the continuous portions having an L shape in cross section are formed.

The two supporting plates 61A and 61B are integrally formed with the head holder 41 by securing the side surface portions 62b of the respective supporting plates 61A and 61B to the long-side portions of the head holder 41. The upper surface portion 62a of the first supporting plate 61A faces the upper sides of the first bearings 55a and 55a disposed apart from each other by a predetermined interval in the front-back direction at one side in the widthwise direction of the print head 31. The upper surface portion 62a of the second supporting plate 61B faces the upper sides of the second bearings 55b and 55b disposed apart from each other by a predetermined interval in the front-back direction at the other side in the widthwise direction of the print head 31.

The guide pins 59a and 59a extending downward (which is substantially parallel to the side surface portion 62b) are provided at respective ends in the longitudinal direction of the upper surface portion 62a of the first supporting plate 61A. The two guide pins 59a and 59a are slidably inserted into respective guide holes 64a and 64a, formed so as to open at the upper sides of the two bearings 55a and 55a. One guide pin 59b extending downward (which is substantially parallel to the side surface portion 62b) is provided at a halfway portion in the longitudinal direction of the upper surface portion 62a of the second supporting plate 61B. The guide pin 59b is slidably inserted into a guide hole 64b, formed so as to open at the upper surface of the linking member 54B. The guide pins 59a, 59a, and 59b, and the guide holes 64a, 64a, and 64b constitute a first guide mechanism that restricts the movement of the head holder 41 and that moves the head holder 41 substantially parallel to the head slider 42.

In addition, for increasing a movement function for parallel movement of the head holder 41 with respect to the head slider 42, in this embodiment, a second guide mechanism 65 is provided. The second guide mechanism 65 has two elongated holes 65a and 65a and two protrusions 65b and 65b, which slidably engage the elongated holes 65a and 65a. At the side surface portion 62b of the first supporting plate 61A, the two elongated holes 65a and 65a are disposed apart from each other by a predetermined interval in the horizontal direction and extend vertically. In correspondence with this, at the inner surface of the first linking member 54A, the two protrusions 65b and 65b protrude inward so as to be spaced apart from each other by a predetermined distance.

Accordingly, the reason that the two types of guide mechanisms are provided for moving the head holder 41 substantially parallel to the head slider 42 is that an electric motor, serving as a power source for operating the head holder 41, must be disposed at one side in the horizontal direction of the print head 31. That is, an adjusting motor 66 (such as a stepping motor) for moving the head holder 41 relative to the head slider 42 is disposed at one side in the widthwise direction of the head holder 41.

The adjusting motor 66 includes a securing section 66a, secured adjacent to the head slider 42, a rotating section 66b, having a feed nut rotatably held by the securing section 66a, and a screw shaft 67, extending through the rotating section 66b. The securing section 66a of the adjusting motor 66 is mounted onto a shelf 68 (provided at the first linking member 54A) and is integrally secured thereto. The screw shaft 67 is mounted to the head holder 41 by securing one end of the screw shaft 67 to the lower surface of the first supporting plate 61A. The screw shaft 67 extends vertically through the center portion of the adjusting motor 66 and protrudes downward from the shelf 68.

The adjusting motor 66 and the screw shaft 67 constitute a distance adjusting unit 60 that adjusts a distance S by moving the print head 31 towards or away from the print surface. Thus, when the adjusting motor 66 is driven, rotation of the feed nut that is based upon rotation of the rotating section 66b causes the screw shaft 67 to move in the axial direction thereof in accordance with the direction of rotation of the feed nut. The movement of the screw shaft 67 causes the head holder 41 (secured through the first supporting plate 61A) and the print head 31 to move relative to each other in a direction perpendicular to the direction of movement (front-back direction) of the head slider 42 (that is, in a direction perpendicular to the principal surface of the optical disc 2).

At this time, the adjusting motor 66 is disposed at one side of the print head 31, with a shaft center line of the screw shaft 67 being positioned at a location that is separated from the central portion of the print head 31. Moving force of the screw shaft 67, which is movable in the shaft center line direction, causes a rotation moment to be generated at the print head 31, so that a component force in a direction orthogonal to the aforementioned perpendicular direction acts upon the print head 31. The component force in the orthogonal direction acts as a resistance force that prevents a smooth movement of the print head 31 in the perpendicular direction.

In contrast, in the embodiment, the two supporting plates 61A and 61B are secured to the head holder 41, and the guide pins 59a of the supporting plate 61A and the guide pin 59b of the supporting plate 61B are provided and slidably engage the guide holes 64a and 64a of the front member 42A and the rear member 42B of the head slider 42 and the guide hole 64b of the second supporting plate 61B. Moreover, since the three guide pins 59a, 59a, and 59b are disposed in a balanced manner so as to form a triangular shape, the three guide pins 59a, 59a, and 59b can be slid in similar states. As a result, it is possible for the head holder 41 to be maintained in a substantially horizontal state, and to smoothly move in parallel in the aforementioned perpendicular direction.

Further, the two elongated holes 65a and 65a are formed in the side surface portion 62b of the first supporting plate 61A, and the two protrusions 65b and 65b, slidably engaging the elongated holes 65a and 65a, are formed in the first linking member 54A. Therefore, the horizontal state of the head holder 41 can be further maintained with precision, and the head holder 41 can be reliably and smoothly moved in the aforementioned perpendicular direction.

The print head 31 provided with the distance adjusting unit 60 having such a structure is movably supported by the two head guide shafts 43A and 43B. As shown in FIG. 5, the first head guide shaft 43A is swingably inserted into the bearing members 58 at the two bearing holes 56a and 56a of the first bearings 55a and 55a provided at one side of the head slider 42. The second guide shaft 43B is slidably inserted into the bearing members 58 at the two bearing holes 56b and 56b of the second bearings 55b and 55b at the other side of the head slider 42.

The two guide shafts 43A and 43B extend in the longitudinal direction of the opening 18 of the chassis plate 18, and are maintained at a predetermined interval from each other and are disposed parallel to each other. Ends of the two guide shafts 43A and 43B are secured to the respective guide bearings 44A and 44B. The guide bearings 44A and 44B are disposed at both ends in the longitudinal direction of the opening 18, and are secured to the chassis plate 17 with securing screws.

The feed screw shaft 45 is disposed at the outer side of the guide shaft 43B so as to be separated therefrom by a predetermined interval. The feed screw shaft 45 is set parallel to the two guide shafts 43A and 43B. A joint 71 mounted to one end of the feed screw shaft 45 in the axial direction thereof links the feed screw shaft 45 to the rotary shaft of the head conveying motor 47. The head conveying motor 47 is secured to a motor bracket 72. The motor bracket 72 is secured to the chassis plate 17 with a securing unit, such as a securing screw. The feed nut 46 is screwed to the feed screw shaft 45. A nut mounting plate 73 is secured to the feed nut 46. The nut mounting plate 73 is secured to the head slider 42 with a securing screw.

Accordingly, when the head conveying motor 47 is driven, rotational force of the rotary shaft thereof is transmitted to the feed screw shaft 45 through the joint 71, and is further transmitted to the feed nut 46. At this time, since the feed nut 46 is secured to the head slider 42 through the nut mounting plate 73, the feed nut 46 does not rotate. However, the head slider 42 is movable in the axial direction of the two head guide shafts 43A and 43B by being guided by the head guide shafts 43A and 43B. Therefore, in accordance with the direction of rotation of the feed screw shaft 45, the feed nut 46 is selectively moved towards or away from the head conveying motor 47. Therefore, the head slider 42 moves together with the feed nut 46, as a result of which the print head 31 moves in the front-back direction, which is the same as the axial direction of the feed screw shaft 45.

The movement of the print head 31 in the front-back direction can be detected by two position detection sensors 74 and 75. The first position detection sensor 74 detects a disc inner-side stoppage position that is reached when the ink discharging unit 37 at the print head 31 moves inwardly in a radial direction of the optical disc 2 and passes a portion nearest the central portion by a predetermined distance. The second position detection sensor 75 detects a disc outer-side stoppage position that is reached when the ink discharging unit 37 at the print head 31 moves outwardly in the radial direction of the optical disc 2 and is positioned at a location that is furthest from the central portion.

For detecting these positions, a position detecting portion 76 is mounted to the nut mounting plate 73. When the position detecting portion 76 is detected by the first position detection sensor 74, the disc inner-side stoppage position is detected, as a result of which the print head 31 is stopped at this position. Similarly, when the position detecting portion 76 is detected by the second position detection sensor 75, the disc outer-side stoppage position is detected, as a result of which the print head 31 is stopped at this position.

FIG. 3 shows a state of the printing device 10 without the chassis plate 17, the printing device 10 being accommodated in the housing 3 and being superimposed upon the disc tray 12, etc. In the optical disc apparatus 1, a head center line Lb, which passes through the ink discharging unit 37 situated at substantially the center of the print head 31 of the printing device 10, is set at a position that is decentered by a distance E from a body center line La passing through a rotation center Oc of the disc mounting unit (turntable) 20, serving as the central portion of the disc drive device 9. Therefore, the print head 31 performs printing on the print surface of the optical disc 2 by moving along a locus of the head center line Lb decentered by the distance E from the rotation center Oc.

Figure 18:
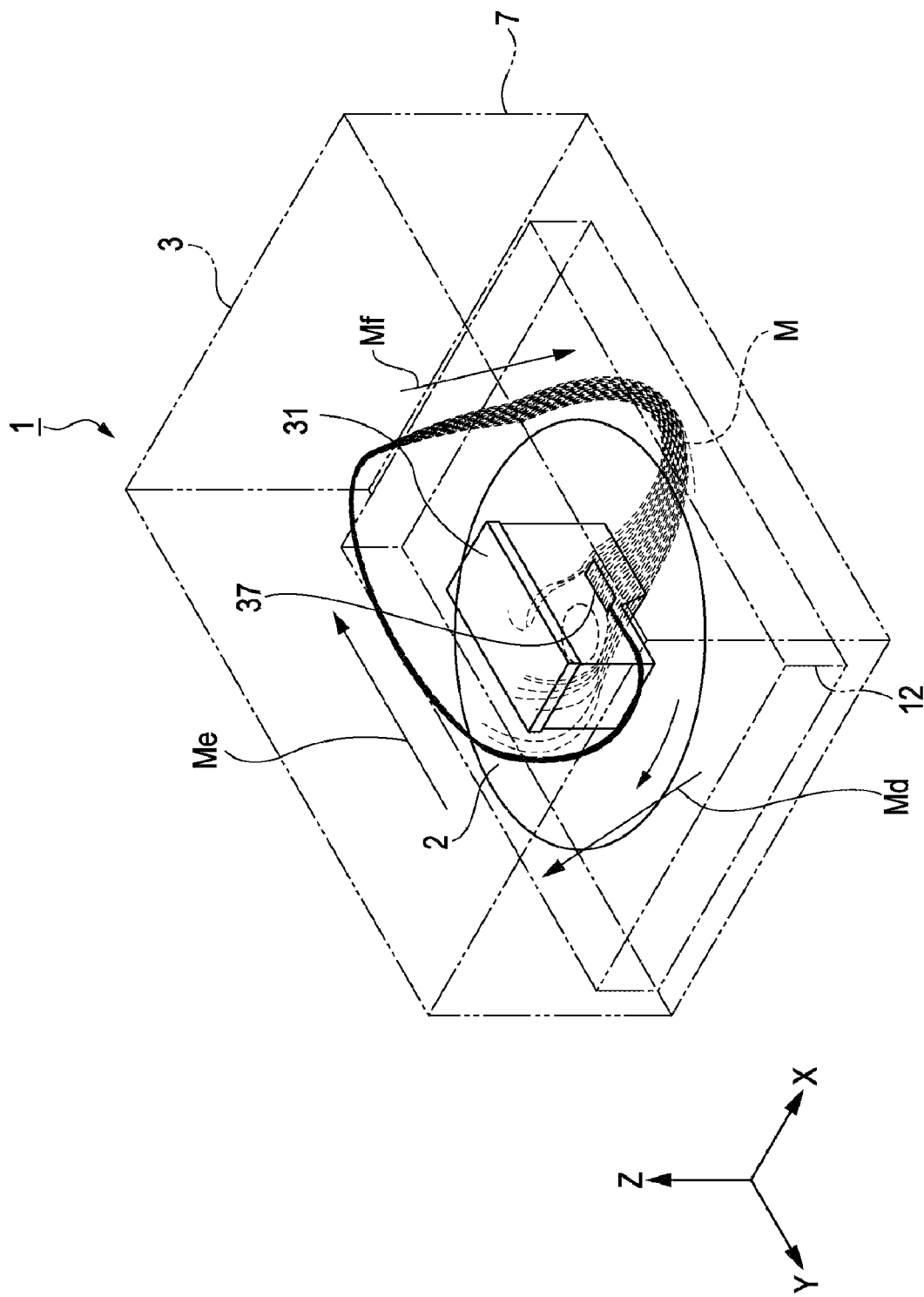
FIG. 18 is a perspective view illustrating a state of flow of mist generated when the print head of the printing device of the optical disc apparatus representing the disc recording and/or reproducing apparatus according to the first embodiment of the present invention performs printing on an inner peripheral side of the disc recording medium.

At the back side of the housing 3, a head cap 77, mounted to the ink discharging unit 37 of the print head 31, and an ink holder 78 are disposed on the head center line Lb. The head cap 77 prevents the nozzles of the ink discharging unit 37 from becoming dried and prevents clogging of the nozzles due to the drying of ink. The ink holder 78 prevents a printing device error in which ink is not discharged due to the use of the head without ink so that air does not enter the nozzles of the ink discharging unit 37. FIG. 18 defines directional property of the optical disc 20. That is, a direction Y of the optical disc 2 is a radial direction, and a direction X orthogonal thereto is a tangential direction.

FIG. 10 is a block diagram showing a flow of a signal in the optical disc apparatus 1. A controlling device 80 of the optical disc apparatus 1 includes a central controlling unit 81, an interface 82, a drive controlling unit 83, a tray driving circuit 84, a recording controlling circuit 85, a signal processing unit 86, a print image generating unit 87, a print controlling unit 88, a distance sensor driving circuit 90, a print mechanism driving circuit 91, an ink discharge driving circuit 92, an ink remaining-amount detection circuit 93, a high-voltage power supply 96, a ground-side electrode 97, and a high-voltage-side electrode 98.

The central controlling unit 81 controls the drive controlling unit 83, the print image generating unit 87, and the print controlling unit 88. The central controlling unit 81 outputs a record data signal, supplied from the interface 82, to the drive controlling unit 83. The central controlling unit 81 outputs an image data signal, supplied from the interface 82, and a position data signal, supplied from the drive controlling unit 83, to the print image generating unit 87 and the print controlling unit 88.

The interface 82 is a connecting unit that electrically connects the optical disc apparatus 1 with an external device, such as a personal computer or a DVD recorder. The interface 82 outputs to the central controlling unit 81 a signal supplied from an external device. The signal supplied to the central controlling unit 81 is a signal corresponding to external storage information stored in the external device. Examples of external storage information are a record data signal, corresponding to record information that is recorded in the information recording section of the optical disc 2, and an image data signal, corresponding to visible information that is printed on the print surface of the optical disc 2 (that is, the front surface or the label sheet of the optical disc 2). Further, the interface 82 outputs a reproduction data signal, read out from the information recording section of the optical disc 2 by the optical disc apparatus 1, to the external device.

Examples of a specification for electrically connecting the optical disc apparatus 1 with such an external device are ATA standard (AT Attachment), Serial ATA standard (SATAT), SCSI standard (Small Computer System Interface), and USB standard (Universal Serial Bus).

The drive controlling unit 83 controls rotation of a spindle motor 21 of the disc rotating mechanism, and operations of the tray driving circuit 84 and the recording controlling circuit 85. That is, the drive controlling unit 83 outputs a control signal on the basis of a control signal supplied from the central controlling unit 81, to drive the spindle motor 21. This causes the optical disc 2, mounted to the turntable 20 at the spindle motor 21, to be rotationally driven, for example, with a linear speed kept constant. Further, for controlling the operations of the tray driving circuit 84 and the recording controlling circuit 85, the drive controlling unit 83 outputs control signals thereto. The drive controlling unit 83 outputs a position data signal, supplied from the signal processing unit 86, to the central controlling unit 81.

The tray driving circuit 84 controls rotation of a driving motor (not shown) of the tray conveying mechanism. The driving motor for the tray is driven on the basis of a control signal output from the tray driving circuit 84. This causes the disc tray 12 to be conveyed between the disc mounting position in the housing 3 and the disc removal position situated outside the housing 3. The recording controlling circuit 85 controls, for example, recording of a record data signal or reproduction of a reproduction data signal by the optical pickup 23.

The optical pickup 23 includes a laser light source 23a and a light-receiving element 23b. A light beam emitted from the laser light source 23a and illuminating the optical disc 2 from a pickup lens is reflected by the information recording section of the optical disc 2, and is received by the light-receiving element 23b. A control signal for executing a track servo operation or a focus servo operation by causing the light beam to follow a track on the information recording section is output from the recording controlling circuit 85 to the optical pickup 23. On the basis of the control signal supplied from the recording controlling circuit 85, a driving motor for the pickup is driven. This causes the optical pickup 23 to move together with the slide member in a radial direction of the optical disc 2.

The signal processing unit 86 demodulates a radio frequency (RF) signal, supplied from the optical pickup 23, or detects an error, to generate a reproduction data signal. On the basis of the RF signal, the signal processing unit 86 detects a position data signal as a signal representing position data of the optical disc 2 or a signal including a particular pattern such as a synchronizing signal. Examples of the position data signal are a rotation angle signal, which indicates the rotation angle of the optical disc 2, and a rotation position signal, which indicates a position of rotation of the optical disc 2. The reproduction data signal and the position data signal are output to the drive controlling unit 83.

The print image generating unit 87 generates a print image on the basis of the control signal supplied from the central controlling unit 81. On the basis of the control signal supplied from the central controlling unit 81, the print controlling unit 81 controls, for example, the print head 31 of the printing device 10, the head driving mechanism that operates the print head 31, the distance detecting unit that detects the distance between the print head and the print surface, and the cleaning mechanism that cleans the print head 31 and the distance detecting unit.

On the basis of image data generated at the print image generating unit 87 and obtained on the basis of the image data signal supplied from the central controlling unit 81, the print controlling unit 88 generates ink discharge data. On the basis of the generated discharge data and the position data signal supplied from the central processing unit 81, the print controlling unit 88 generates a control signal that controls the printing device 10. The control signal is output to the print mechanism driving circuit 91 and the ink discharge driving circuit 92. By controlling the print mechanism driving circuit 91 and the ink discharge driving circuit 92 using the print controlling unit 88, a desired visible information is printed onto the print surface of the optical disc 2 through the controlling of the print head 31.

On the basis of the control signal supplied from the print controlling unit 88, the print mechanism driving circuit 91 drives the head conveying motor 47, the head cap 77, a suction pump 94, and a blade 95. At this time, by driving the head conveying motor 47, the print head 31 is moved outward from a radial-direction inner side of the optical disc 2. The direction of movement of the print head 31 may be opposite to that in the embodiment, that is, it may be inward from a radial-direction outer side of the optical disc 2.

The ink discharge driving circuit 92 drives the print head 31 on the basis of the control signal supplied from the print controlling unit 88. This causes ink drops to be discharged from the discharge nozzles of the ink discharging unit 37 of the print head 31, and to adhere to the print surface of the rotationally driven optical disc 2. The print head 31 contains three colors, such as cyan (C), yellow (Y), and magenta (M). When the three types of ink are combined, the combination is displayed as visible information including image data represented in gradation values indicating the brightnesses of the colors, red (R), green (G), and blue (B).

Further, the ink discharge driving circuit 92 detects the remaining amount of ink contained in the print head 31, to display the remaining amount using a displaying unit. The detection of the remaining amount of ink is performed in accordance with ink used. However, since the amount of use of ink depends upon a printing condition, ordinarily, a displaying operation that indicates that the remaining amount of ink is small is performed when any one of remaining amounts of ink is reduced to an amount less than or equal to a predetermined value.

On the basis of the control signal from the print controlling unit 88, the high-voltage power supply 96 applies a high voltage (such as a voltage of a few kilovolts (kV)) between a high-voltage-side output and a ground-side output of the high-voltage power supply 96. The ground-side output of the high-voltage power supply 96 is connected to, for example, the ground-side electrode 97 for the tray body 14 or the print head 31. The high-voltage-side output of the high-voltage power supply 96 is connected to, for example, the high-voltage electrode 98 for an electrode plate 102. The control signal from the print controlling unit 88 can be used to attract mist while ink drops are discharged from the discharge nozzles of the ink discharging unit 37 of the print head 31 (that is, while an inkjet printing operation is being performed) and/or while ink drop mist is floating in the drive.

Then, an electric field generated due to a high-voltage potential difference and in a space in the interior of the drive causes the ink drop mist (described later) to be attracted to a mist attracting unit. The polarity of the high-voltage potential difference may be either positive or negative.

In general, not all ink drops discharged from the print head 31 of the printing device 10 land on the print surface. The ink drops which do not land on the print surface float in the device, thereby staining, for example, the units and mechanisms in the interior of the device. Here, as shown in FIG. 12A, when an ink drop N is discharged from the ink discharging unit 37 of the print head 31 while the optical disc 2 is not rotating, the ink drop N having sufficient discharge speed drops substantially perpendicularly to the label surface 2a of the optical disc 2 (which is a print medium), and adheres to the label surface 2a.

Accordingly, if there is no relative movement between the print head 31 and the optical disc 2 (which is a print medium) and if the amount of movement of surrounding air is small, the amount of mist generated by the discharge of the ink drop N is small. However, if there is no relative movement between the print head 31 and the print medium, it is difficult to print an image by the inkjet method. Therefore, if there is relative movement between the print head 31 and the print medium, the ink drop N that does not land on the label surface 2a of the optical disc 2 becomes mist M, which floats in the device.

In the embodiment, printing is performed while rotationally driving the optical disc 2 with the spindle motor 21 of the disc rotating mechanism. That is, what is called an Rθ printing method is used. When, as indicated by the arrow shown in FIG. 11, the optical disc 2 is rotated at a constant speed by the disc mounting unit, a steady air flow, which is produced along the rotation of the optical disc 2 and which is directed outward in a radial direction from the center of the optical disc 2, is generated around the optical disc 2.

Therefore, when, as shown in FIG. 12B, an ink drop N is discharged from the ink discharging unit 37 of the print head 31 in an air current generated by rotationally driving the optical disc 2, the ink drop N subjected to sufficient discharge speed receives a perpendicular inertial force G and a horizontal force R. The perpendicular inertial force G is generated on the basis of the speed at which the discharged ink drop N flies and air resistance with respect to the flying. The horizontal force Rs is received due to the flow of air resulting from the rotation of the optical disc 2. In addition, a resultant force S of the inertial force G and the horizontal force R acts upon the ink drop N. Here, since the inertial force G is sufficiently larger than the horizontal force R, the ink drop N slightly moves in the direction of air flow from a location that is directly below the ink discharging unit 37, and adheres to the label surface 2a of the optical disc 2.

Similarly, an ink drop (hereunder referred to as "mist M") having a low discharge speed or subjected to a high air resistance also receives a perpendicular inertial force Gs and a horizontal force Rs. The perpendicular inertial force Gs is generated on the basis of the speed at which the discharged mist M flies and air resistance with respect to the flying. The horizontal force Rs is received due to air flow. In addition, a resultant force Ss of the inertial force Gs and the horizontal force Rs acts upon the mist M. Here, a fly speed during discharge is slow and/or the air resistance with respect to the flying is larger compared with the mass because the size of the mist M is small. Therefore, the inertial force Gs exerted upon the ink drop N is smaller than the inertial force G exerted upon the ink drop N subjected to sufficient discharge speed.

As a result, the mist M floats in the housing 3 by being caused to flow by the air without the mist M adhering to the label surface 2a of the optical disc 2. Therefore, the floating mist M is adhered to, for example, a pickup lens of the optical pickup 23, thereby staining a lens used for reading and writing information, as a result of which improper reading and writing operations are performed more frequently. In addition, the mist M may adhere to, for example, an electrical circuit, which may result in improper operations.

Figure 13:
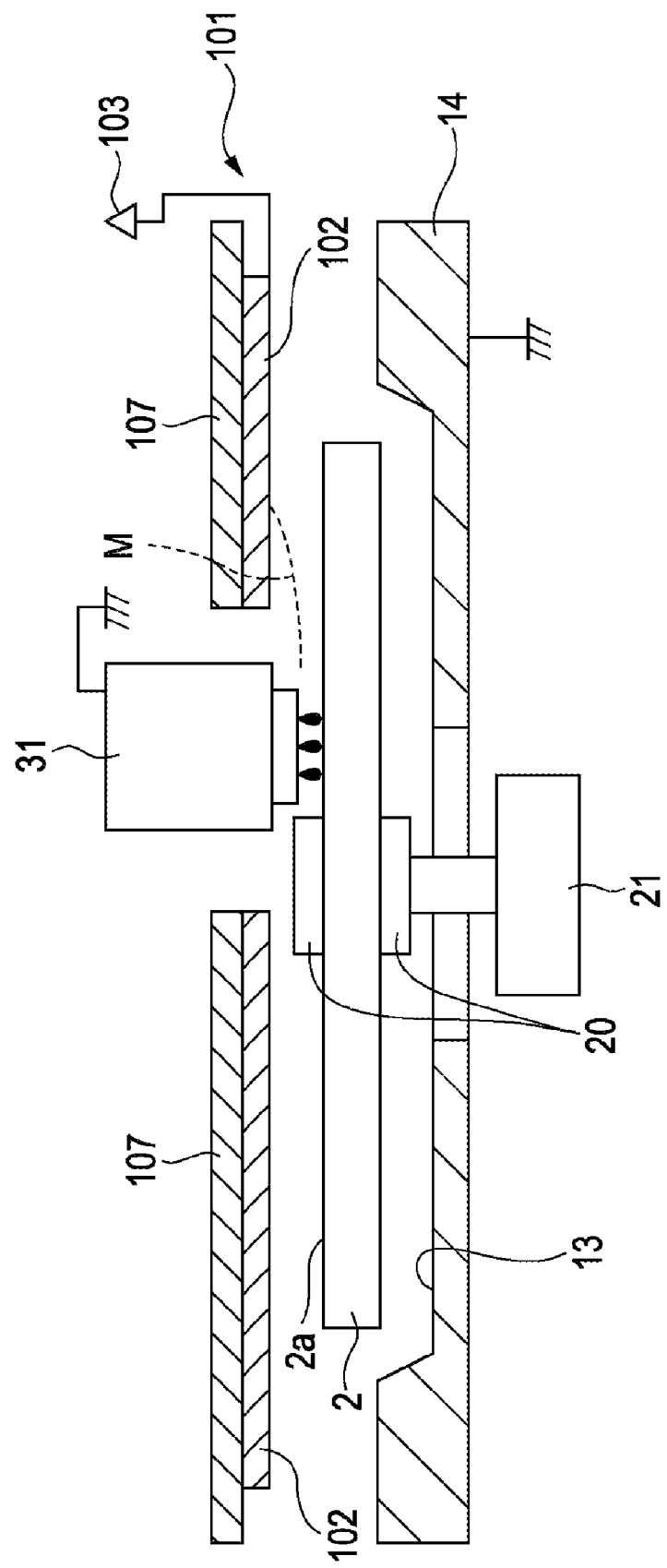
FIG. 13 shows in cross section a first exemplary mist attracting unit of the optical disc apparatus representing the disc recording and/or reproducing apparatus according to the first embodiment of the present invention.

As shown in FIG. 13, for preventing the occurrence of problems arising from the adsorption of the floating mist M, in the embodiment, a mist attracting unit 101 is provided in the housing 3. The mist attracting unit 101 attracts and adsorbs the mist M thereto using electrostatic force by generating an electric field in a space accommodating the optical disc 2 by applying a predetermined voltage. The mist attracting unit 101 includes two electrode plates 102 and 102 and a high-voltage power supply 103 (corresponding to, for example, the high-voltage power supply 96 and the high-voltage electrode 98 shown in FIG. 10), which applies a predetermined voltage to the two electrode plates 102 and 102.

The two electrode plates 102 and 102 face the label surface 2a of the optical disc 2 with the print head 31 being interposed between the electrode plates 102 and 102. The two electrode plates 102 and 102 are supported by top plates 107, and are mounted to the inner side of the upper surface portion 5a of the upper plate 5 of the housing 3. The ground-side output of the high-voltage electrode 96 and the ground-side electrode 97 are connected to the print head 31 and the tray body 14, which are defined as ground (0 V).

Figure 14:
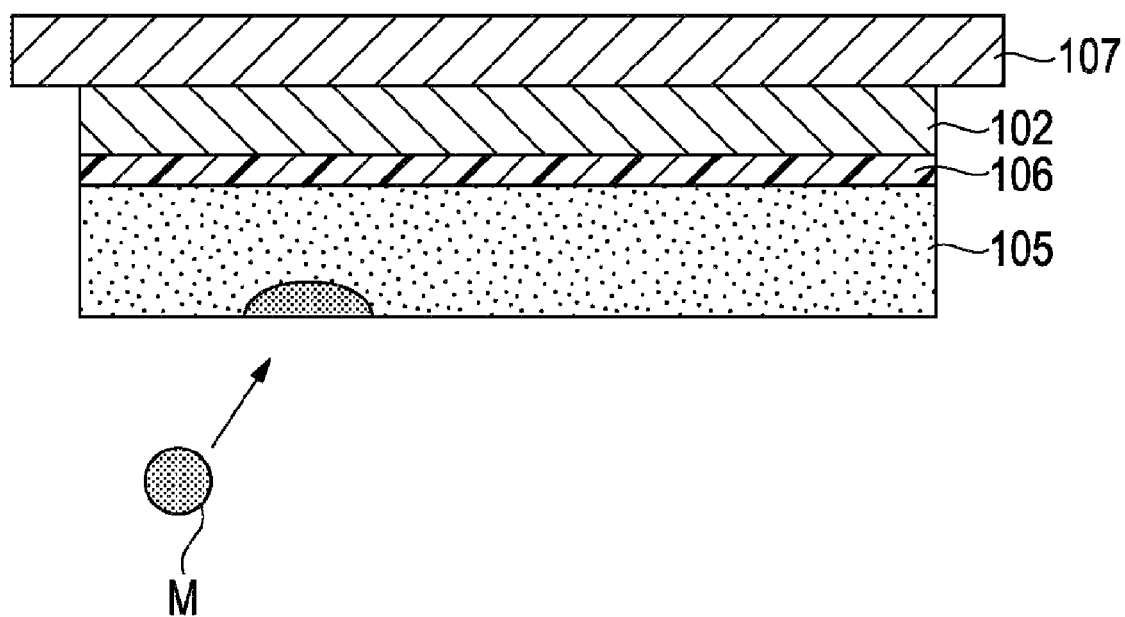
FIG. 14 is a sectional view of an electrode plate of the mist attracting unit of the optical disc apparatus representing the disc recording and/or reproducing apparatus according to the first embodiment of the present invention.

As shown in FIG. 14, the electrode plate 102 has a substantially flat form, and is secured to the substantially flat top plate 107 by a securing method, such as an adhering method. The electrode plate 102 is formed of, for example, an electrically conductive material that conducts a high voltage, such as a metal (copper, iron, aluminum, gold, silver, etc.) or an electrically conductive resin. A mist adsorbing section 105 that adsorbs the mist M is provided at a side of the electrode plate 102 facing the optical disc 2. A non-transmission portion 106 is interposed between the electrode plate 102 and the mist adsorbing section 105. Accordingly, a three-layer structure including the electrode plate 102, the mist adsorbing section 105, and the non-transmission portion 106 is formed.

The mist adsorbing section 105 has a substantially flat form, and is disposed at a side of the electrode plate 102 facing the optical disc 2 through the non-transmission portion 106. The mist adsorbing section 105 is formed of, for example, a porous material, such as sponge or sea sponge, or fibrous material, such as non-woven cloth or paper. Accordingly, when the mist adsorbing section 105 is formed of a porous material or a fibrous material, it is no longer possible for, for example, dye or pigment contained in the adsorbed mist M to drop from the electrode plate 102. As a result, it is possible to prevent the attracted mist M from staining the label surface 2a of the optical disc 2, and dust from adhering to the clothes and skin of a user. Further, the effects of an electric field, and the surface structure and the surface nature of the mist adsorbing section 105 make it possible to adsorb not only the mist M but also dust and powder dust, so that cleaning performance in the housing 3 can be improved.

The non-transmission portion 106 has the form of a film, is mounted to the electrode plate 102 so as to cover an entire surface of the electrode plate 102, and is interposed between the electrode plate 102 and the mist adsorbing section 105. The non-transmission portion 106 is formed of a material that does not pass the moisture of the mist. An example thereof is a film of polymeric resin, such as polyethylene (PE), polyethylene terephthalate (PET), and polypropylene (PP). The electrode plate 102 is covered by the non-transmission portion 106, so that it is possible to prevent the moisture of the scattered mist M from moving towards the electrode plate 102. As a result, it is possible to prevent an electric leakage, an electric discharge, and electrification caused by adherence of the mist M to the electrode plate 102. Further, even if foreign matter enters the interior of the housing 3 or even if a user touches the electrode plate 102, it is possible to reduce the amount of current that flows due to the touching of the electrode plate 102, and to prevent an electric leakage, an electric discharge, and electrification from occurring.

Next, a mist adsorbing operation of the mist attracting unit 101 having such a structure will be described. First, when the optical disc 2 is rotationally driven by the spindle motor 21, an air flow of a certain flow rate is generated around the optical disc 2. The print head 31 and the tray body 14 are connected to ground, so that the electrical potential is set to 0 V. Under this environment, when a voltage (such as a voltage of −2 kV) is applied to the electrode plates 102, an electric field is generated in the space in which the optical disc 2 is accommodated. The polarity of the voltage applied to the electrode plates 102 may be either positive or negative.

Figure 15:
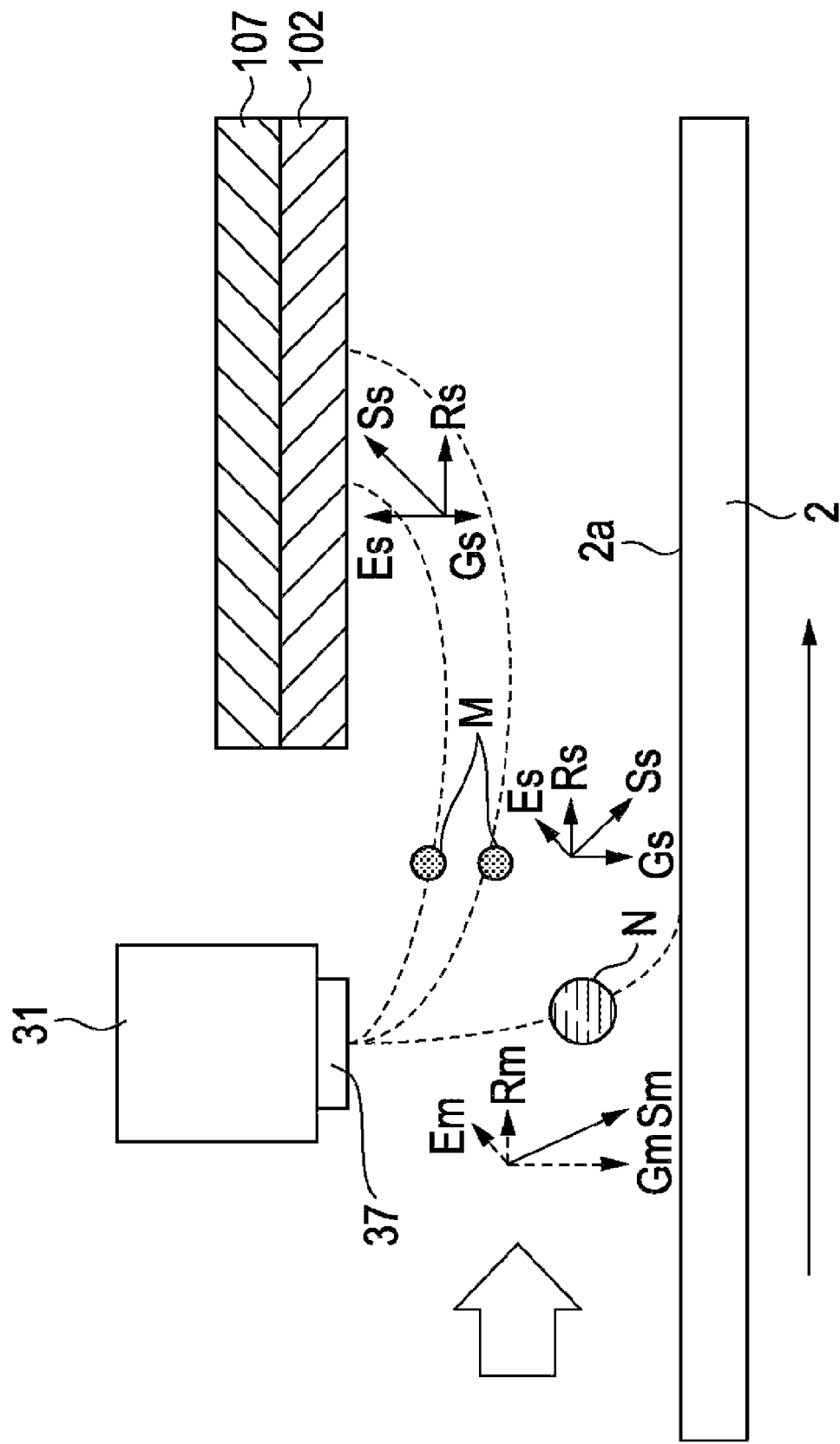
FIG. 15 illustrates an adsorbing operation of mist by the mist attracting unit of the optical disc apparatus representing the disc recording and/or reproducing apparatus according to the first embodiment of the present invention.

In this state, the ink drop N is discharged towards the label surface 2a of the optical disc 2 from the print head 31. Due to this, as shown in FIG. 15, the ink drop N subjected to a sufficient discharge speed from the print head 31 receives a slight amount of gravity Em due to the electric field generated by applying the voltage to the electrode plates 102. The ink drop N is also subjected to the influence of a horizontal force Rm which acts due to the air flow resulting from the rotation of the optical disc 2. A resultant force Sm of the inertial force Gm, the force Rm (generated by the flow of air), and the gravity Em (generated by the electric field) becomes a balance of force, and acts upon a fly path of the ink drop N. However, since the inertial force Gm (generated on the basis of the air resistance and the fly speed produced by the discharge) is large, the ink drop N adheres to the label surface 2a of the optical disc 2 without being adsorbed to the electrode plates 102.

Since the inertial force Gs (generated on the basis of the air resistance and the fly speed produced by the discharge) is small, and the influence resulting from the horizontal force Rs received from the air flow is large, the mist M of the ink drop N moves on the air flow, and floats. When the mist M approaches the electrode plates 102, the mist M receives gravity Es (electrostatic force), produced by an electric field generated by applying a voltage to the electrode plates 102. A resultant force Ss of the inertial force Gs, the force Rs (generated by the flow of air), and the gravity Es (generated by the electric field) becomes a balance of force. However, since the inertial force Gs is small and the gravity Es is generated by an electric field, a vertical velocity vector is reduced.

Although the mist M continues to fly, the initial inertial force Gs obtained by the discharge is gradually reduced, as a result of which the path of the mist M approximates to a path in which the mist M is caused to flow by the air flow generated by the rotation of the optical disc 2. However, the gravity Es (electrostatic force), produced by the electric field generated by applying the voltage to the electrode plates 102, continues to act upon the mist M. As a result, the path of the mist M flying in the direction of the label surface 2a of the optical disc 2 (that is, the downward direction in FIG. 15) from the print head 31 by the discharge operation gradually changes to a path in an upward direction where the electrode plates 102 are disposed.

Further, when the mist M continues to fly, the mist M further receives the gravity Es (generated by an electric field vector in a space on a fly path) while moving on the air flow, produced by the rotation of the optical disc 2, and along an inclination of an equipotential surface. In addition, the mist M is adsorbed to the electrode plates 102 (or the mist adsorbing section 105 mounted to the electrode plates 102).

According to the embodiment, the synergistic effect of the air flow of a certain direction (generated when the optical disc 2 is rotationally driven) and the electric field (generated by the mist attracting unit 101) makes it possible to efficiently adsorb the mist M by moving the mist M towards the electrode plates 102 of the mist attracting unit 101. This makes it possible to prevent or reduce staining of surrounding devices by the mist M.

Figure 16:
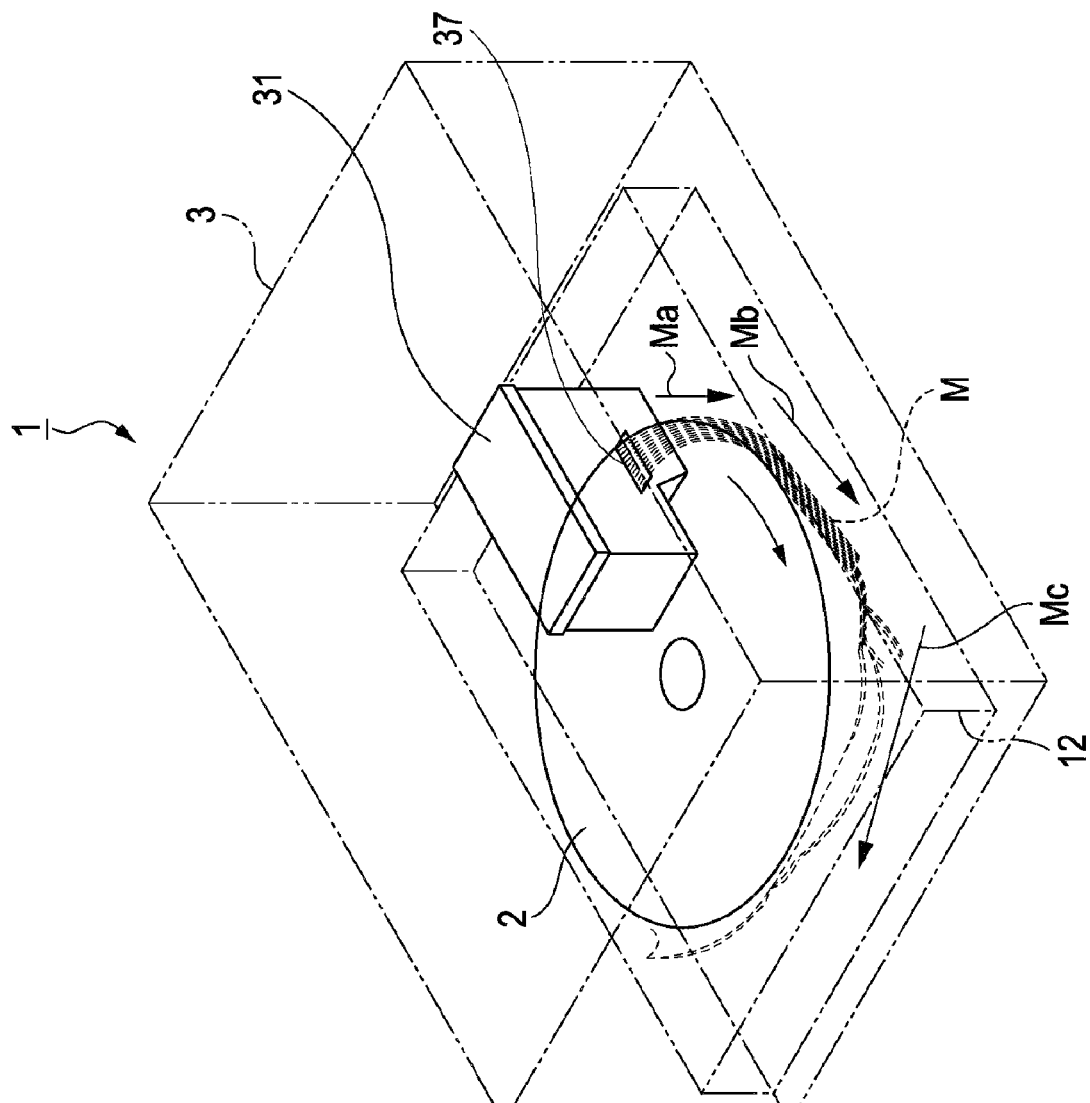
FIG. 16 is a perspective view illustrating a state of flow of mist generated when the print head of the printing device of the optical disc apparatus representing the disc recording and/or reproducing apparatus according to the first embodiment of the present invention performs printing on an outer peripheral side of the disc recording medium.
Figure 17:
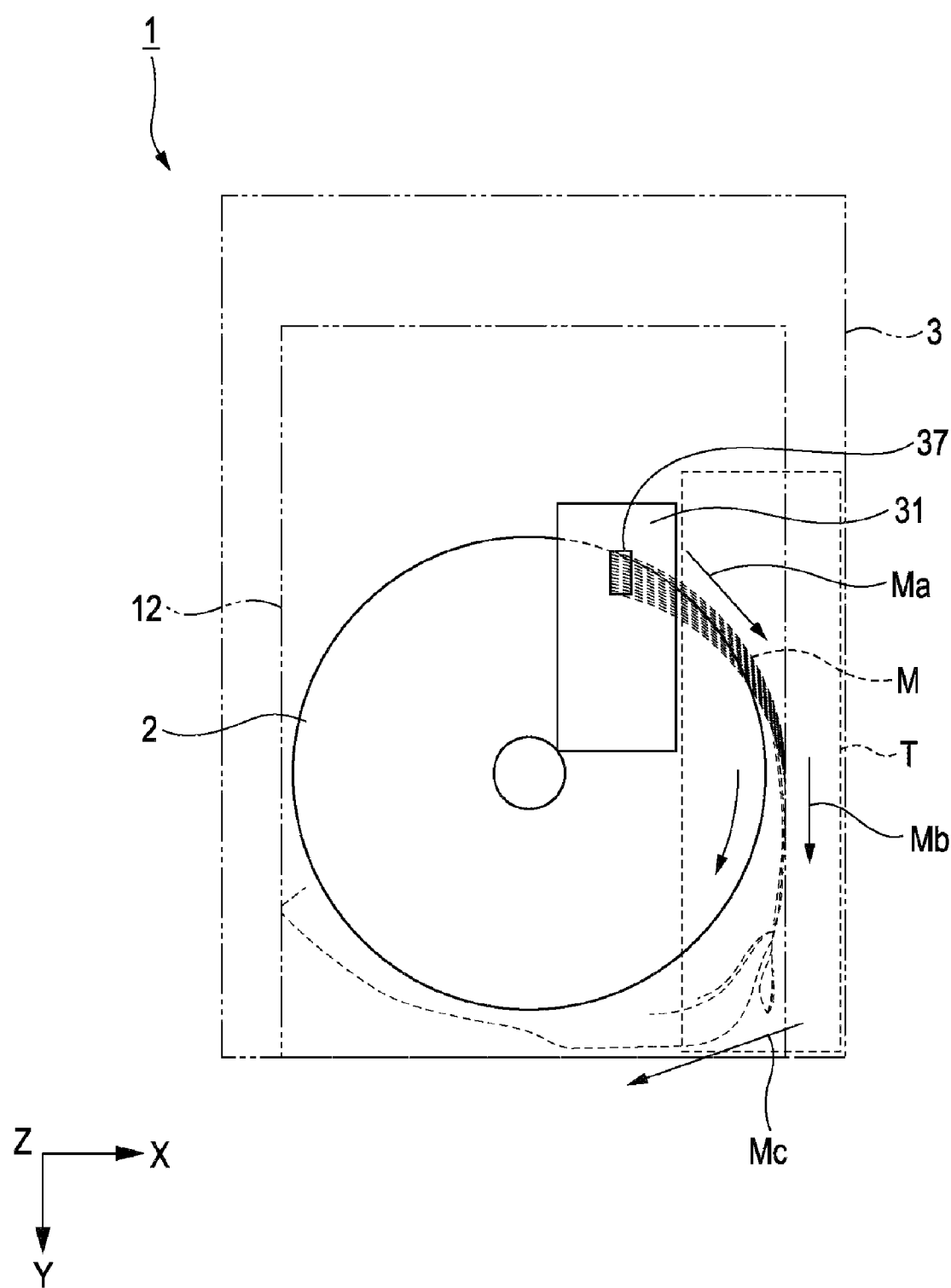
FIG. 17 is a plan view illustrating the state of flow of mist generated when the print head of the printing device of the optical disc apparatus representing the disc recording and/or reproducing apparatus according to the first embodiment of the present invention performs printing on the outer peripheral side of the disc recording medium.
Figure 19:
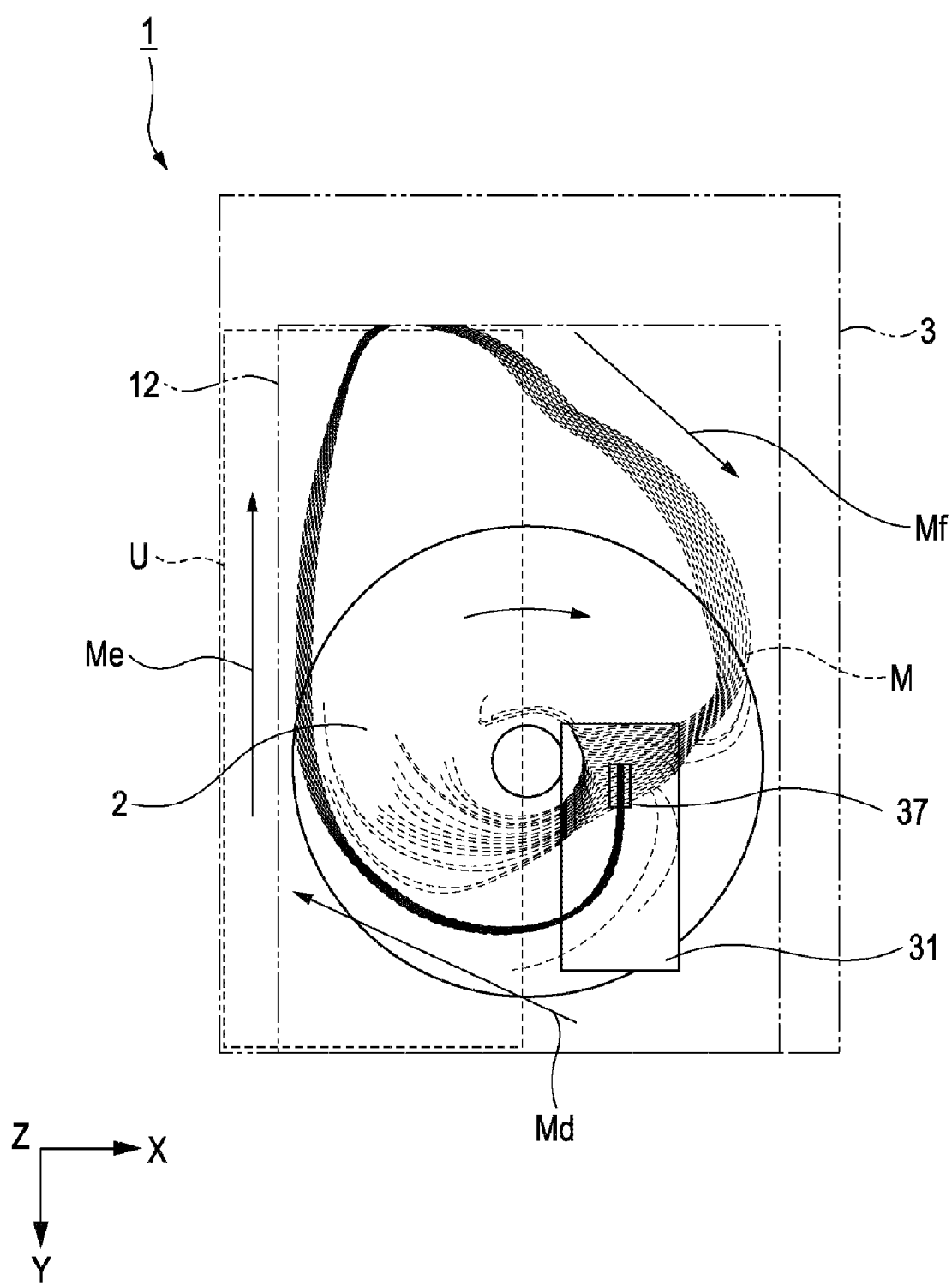
FIG. 19 is a plan view illustrating the state of flow of mist generated when the print head of the printing device of the optical disc apparatus representing the disc recording and/or reproducing apparatus according to the first embodiment of the present invention performs printing on the inner peripheral side of the disc recording medium.

For further efficiently adsorbing the mist, it is desirable that the electrode plates 102 be disposed at a locations where the floating amount (density) of the mist M is the highest. Desirable locations for disposing the electrode plates 102 will hereunder be described with reference to FIGS. 16 to 19. FIGS. 16 and 17 are, respectively, a perspective view and a plan view of a state of flow of the mist M of the ink drop N when printing to the outer peripheral side of the optical disc 2. FIGS. 18 and 19 are, respectively, a perspective view and a plan view of a state of flow of the mist M of the ink drop N when printing to the inner peripheral side of the optical disc 2. In FIGS. 16 to 19, the optical disc 2 rotates clockwise.

First, as shown in FIGS. 16 and 17, when the print head 31 prints onto the outer peripheral side of the optical disc 2, the mist M of the ink drop N discharged from the print head 31 floats in the housing 3 due to air flow produced when the optical disc 2 is rotationally driven. More specifically, using the ink discharging unit 37 of the print head 31 as a source, the mist M of the ink drop N discharged from the ink discharging unit 37 of the print head 31 moves on the air flow generated by the rotation at the label surface 2a of the optical disc 2, and flies towards a downstream side in the direction of rotation of the optical disc 2, that is, towards a side wall of the print head 31 at the housing 3 from the outer periphery of the optical disc 2 in the arrangement according to the embodiment of the present invention, and is scattered (refer to arrow Ma in FIGS. 16 and 17).

Next, the mist M reaches an outermost peripheral side portion of the optical disc 2, and, then, reaches a location beyond the outermost periphery thereof where the optical disc 2 does not exist. Then, an air flow including the mist M collides with a side wall of the housing 3 (refer to arrow Mb in FIGS. 16 and 17). When the mist M collides with the side wall of the housing 3, the mist M moves on the air flow generated at a side portion of the optical disc 2 and at the structure of the housing 3 situated around the side portion of the optical disc 2 when the optical disc 2 is rotationally driven; and is scattered in the entire housing 3. At this time, after the air flow including the mist M reaches the location beyond the outermost periphery where the optical disc 2 does not exist, and, then, collides with the side wall of the housing 3, the mist M moves not only on an air flow passing the label surface 2a of the optical disc 2, but also an air flow passing a side opposite to the label surface 2a of the optical disc 2, that is, below the information recording surface. As a result, the mist M is scattered in the entire housing 3 (refer to arrow Mc in FIGS. 16 and 17).

Here, as shown in FIG. 17, with reference to the ink discharging unit 37, the floating amount (density) of the mist M is highest at an area T surrounded by dotted lines at the downstream side in the direction of rotation of the optical disc 2. Therefore, it is effective to adsorb the mist M at the location where the floating amount (density) of the mist M is highest. In particular, before the mist M reaches the outermost peripheral side portion of the optical disc 2, the density at the label surface 2a of the optical disc 2 is high. After the mist M reaches the outermost peripheral side portion of the optical disc 2, at the side portion of the optical disc 2 and in the space in the housing 3 situated around the side portion of the optical disc 2, the densities at both a space at the label-surface-2a side of the optical disc 2 and a space at the information-recording-surface side of the optical disc 2 are high.

Therefore, when printing is performed on the outer peripheral side of the optical disc 2, it is desirable to dispose the electrode plates 102 at the area T (that is, at the downstream side in the direction of rotation of the optical disc 2 from the ink discharging unit 37) where the floating amount (density) of the mist M is the highest. This makes it possible to efficiently adsorb the mist M, thereby making it possible to increase a staining prevention effect in the housing 3 using the mist attracting unit 101.

Figure 11:
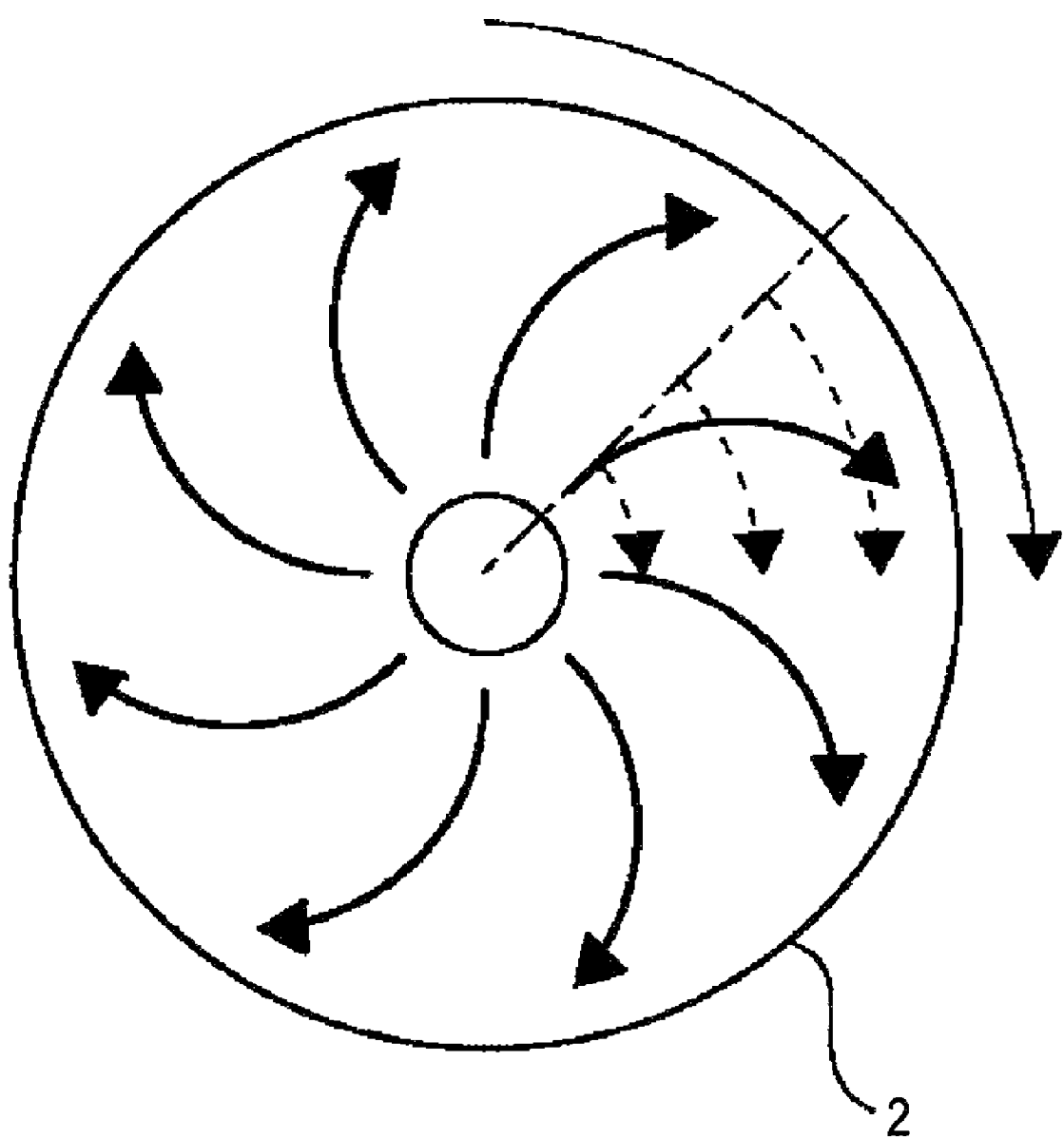
FIG. 11 illustrates a flow of air generated when a disc recording medium is rotationally driven.

Next, as shown in FIGS. 18 and 19, when the print head 31 performs printing on the inner peripheral side of the optical disc 2, the mist M of the ink drop N discharged from the print head 31 floats in the housing 3 due to the air flow generated when the optical disc 2 is rotationally driven. More specifically, as shown in FIG. 11, the air flowing around the optical disc 2 flows outward in a radial direction from the center of the optical disc 2 and along the direction of rotation of the optical disc 2. Therefore, while the mist M of the ink drop N discharged from the print head 31 rotates along the direction of rotation of the optical disc 2, the mist M floats so as to describe an arc towards the outer side (outer periphery) from the center of the optical disc 2 (refer to arrow Md in FIGS. 18 and 19). Next, when the mist M reaches the outermost peripheral side portion of the optical disc 2, moves away from the outer periphery of the optical disc 2, and reaches the location where the optical disc 2 does not exist, the mist M floats along a side wall of the housing 3 (refer to arrow Me in FIGS. 18 and 19). Then, the mist M moves on the air flow in the housing 3, and is scattered while circulating in the housing 3.

In the arrangement in the interior of the housing 3 according to the embodiment, a space for moving the disc tray 12 and the optical pickup 23 is provided at the bottom side and opposite to the disc slot 11. Therefore, after circulating in the housing 3, the mist M approaches a vicinity of the optical disc 2 due to air flow generated by the re-rotation of the optical disc 2 (refer to arrow Mf in FIGS. 18 and 19). Then, the mist M moves on the air flowing over the label surface 2a of the optical disc 2 and under the information recording surface, and is, further, scattered in the housing 3.

Here, as shown in FIG. 19, with reference to the ink discharging unit 37, the floating amount (density) of the mist M is highest at an area U surrounded by dotted lines at the downstream side in the direction of rotation of the optical disc 2. Therefore, it is effective to adsorb the mist M at the location where the floating amount (density) of the mist M is the highest. Consequently, when printing is performed on the inner peripheral side of the optical disc 2, it is desirable to dispose the electrode plates 102 at the area U (that is, at the downstream side in the direction of rotation of the optical disc 2 from the ink discharging unit 37) where the floating amount (density) of the mist M is the highest. This makes it possible to efficiently adsorb the mist M, thereby making it possible to increase the staining prevention effect in the housing 3 using the mist attracting unit 101.

In the embodiment, although the print head 31 is defined as ground (0 V), and a voltage (for example, −2 kV) is only applied to the electrode plates 102, the present invention is not limited thereto. For example, it is possible to apply a voltage to the electrode plates 102, and a voltage having a polarity opposite to that of the electrode plates 102 (for example, +2 kV that is opposite to −2 kV) to the print head 31, to apply a voltage to the mist M and the ink drop N discharged from the print head 31. By this, properly setting an electric potential at the electrode plates 102 and the print head 31, such as applying a large potential difference, the mist M is easily pulled towards the electrode plates 102 having a voltage of an opposite polarity, so that the mist M can be more effectively adsorbed.

In the embodiment, the electrode plates 102 are described as being mounted to the lower surface side of the chassis plate 17 of the housing 3. However, the location where the electrode plates 102 are mounted is not limited thereto. For example, if a structure is further provided at the lower-surface-side of the chassis plate 17, the electrode plates 102 may be mounted to the lower portion of the structure, which faces the label surface 2a of the optical disc 2 and forms a space through which the mist M passes.

Further, although, in the embodiment, the print head 31 and the tray body 14 are defined as ground (0 V), and a voltage (for example, −2 kV) is only applied to the electrode plates 102, it is desirable that the voltage be applied to the electrode plates 102 from the high-voltage power supply 103 so that the strength of the electric field generated in the area defined by the print head 31, the tray body 14, and the electrode plates 102 is greater than or less than 200 kV/m. This is because, when the electric field strength is less than 200 kV/m, it may be difficult to sufficiently collect the mist M.

Here, the relationship between the strength of the electric field and a collection/adsorption effect of the mist M will be described on the basis of the results of experiments carried out by the inventor et al. In the experiment, with the size of a gap (separation distance) at a location where the electrode plates 102 were closest to the tray body 14 being 4 mm, the voltage applied to the electrode plates 102 was changed to confirm the scattered state of the mist M on the basis of the degree of staining of the information recording surface of the optical disc 2. The results shown in Table 1 below were obtained.

TABLE 1

| APPLIED VOLTAGE (V) | ELECTRIC FIELD (Kv/M) | DETERMINATION | DEGREE OF STAINING |
|---|---|---|---|
| 0 | 0 | NOT GOOD | ADHESION OF A LARGE AMOUNT OF INK MIST |
| 400 | 100 | NOT GOOD | ADHESION OF A LARGE AMOUNT OF INK MIST |
| 800 | 200 | FAIR | AMOUNT OF ADHESION OF MIST IS REDUCED |
| 1200 | 300 | GOOD | ADHESION OF A SLIGHT AMOUNT OF MIST |
| 1600 | 400 | VERY GOOD | VIRTUALLY NO ADHESION OF MIST |
| 2000 | 600 | VERY GOOD | VIRTUALLY NO ADHESION OF MIST |

As shown in Table 1, a mist collection effect was obtained at an electric field strength greater than or equal to 200 kV/m. It was confirmed that, at an electric field strength greater than or equal to 400 kV/m, the mist could be sufficiently collected so that almost no mist M adhered to the information recording surface of the optical disc 2.

In Table 1, with regard to the definition of the electric field strength, the gap (separation distance) at the location where the electrode plates 102 were closest to the tray body 14 served as a reference. In the recess of the disc accommodating unit 13 at the tray body 14, the size of a gap (separation distance) is larger than 4 mm, that is, is from 7 mm to 9 mm. Therefore, in the experiment, regarding locations near the optical disc 2, there were locations where the electric field strengths thereof were less than or equal to approximately half of the electric field strengths shown in Table 1. Therefore, when the electric field strength at a location where it is low is defined as a reference, it is possible to obtain a sufficient mist collection effect if the electric field strength is greater than or equal to 100 kV/m, desirably, greater than or equal to 200 kV/m.

Figure 20:
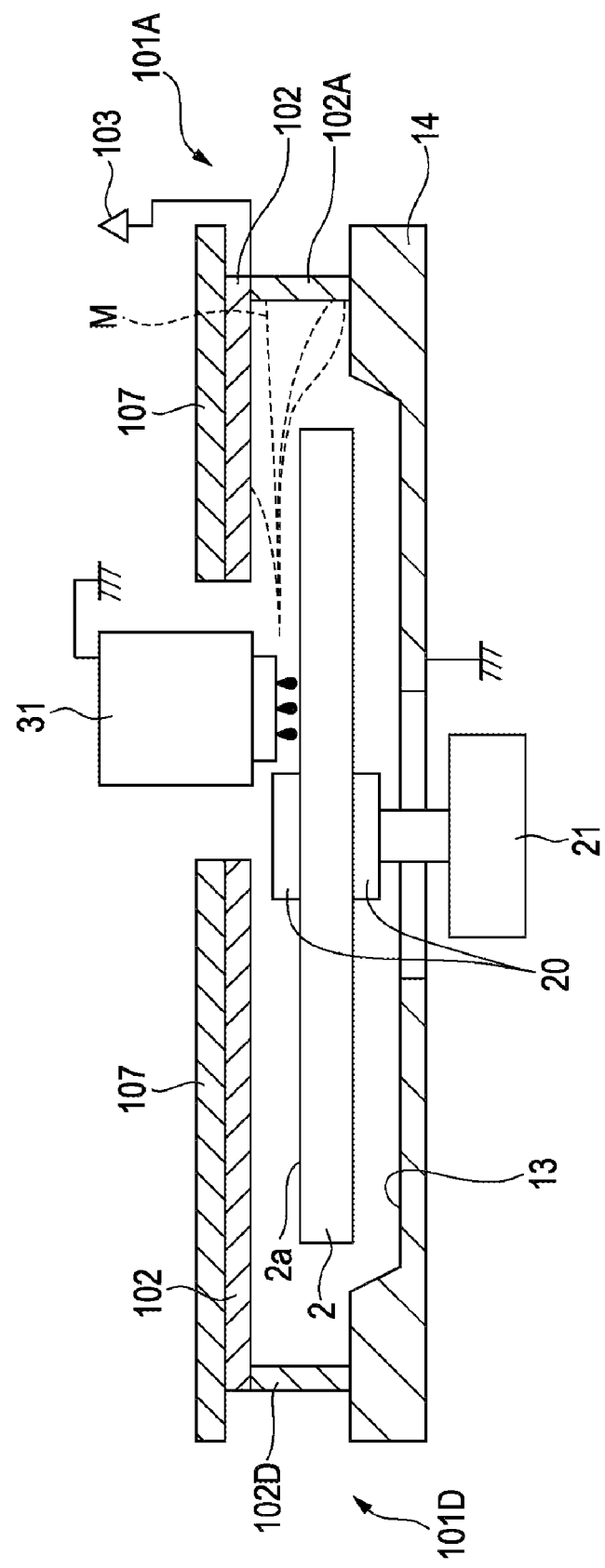
FIG. 20 illustrates in cross section second exemplary mist attracting units of the optical disc apparatus representing the disc recording and/or reproducing apparatus according to the first embodiment of the present invention.
Figure 21:
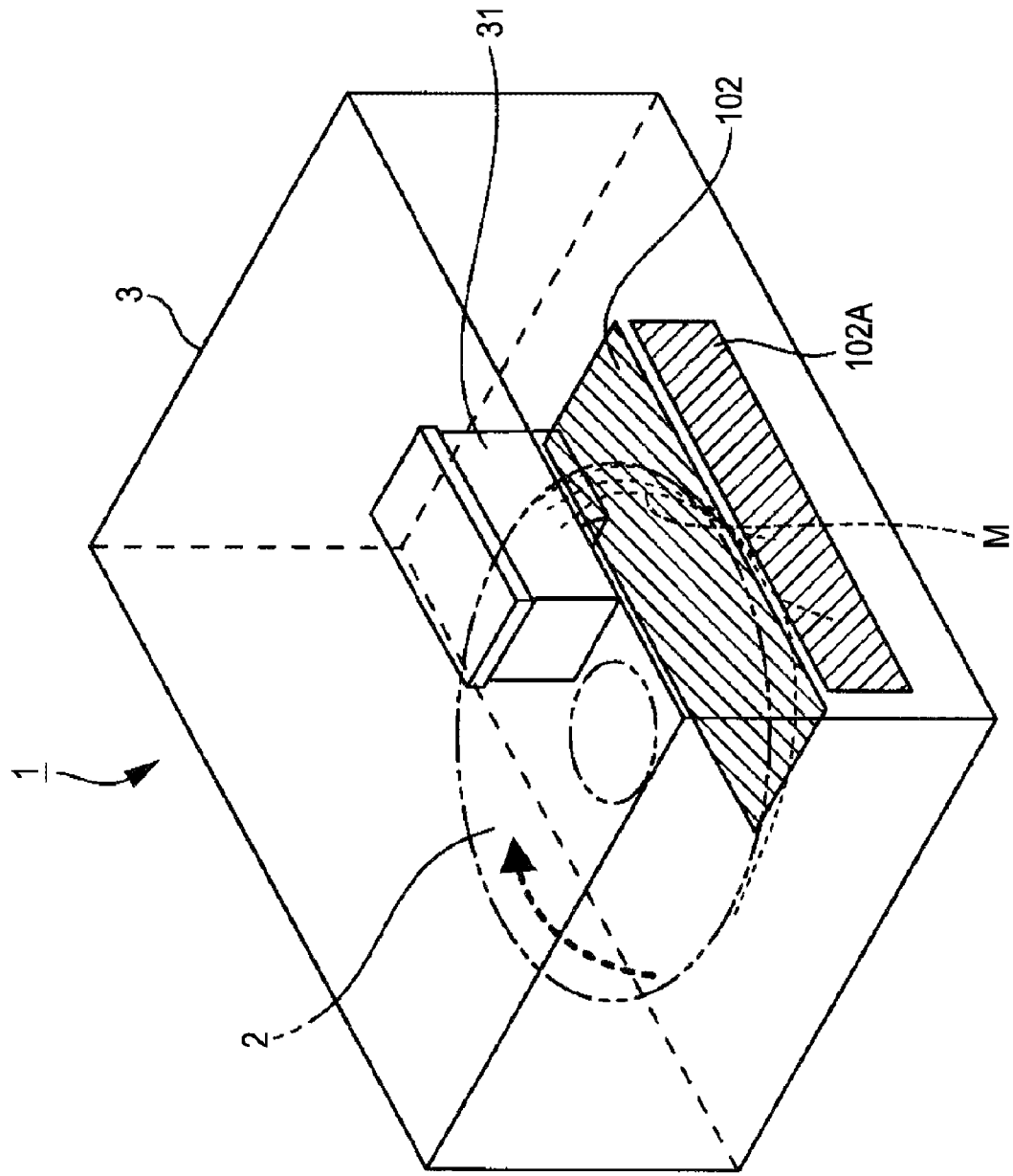
FIG. 21 is a schematic perspective view of the second exemplary mist attracting units of the optical disc apparatus representing the disc recording and/or reproducing apparatus according to the first embodiment of the present invention.

FIGS. 20 and 21 illustrate second exemplary mist attracting units. In the second exemplary mist attracting units 101A and 101D, in addition to disposing electrode plates 102 facing the label surface 2a of the optical disc 2, second electrode plates 102A and 102D are disposed at locations facing outer sides in a radial direction of the optical disc 2. That is, the first electrode 102 is disposed at the inner side of the upper surface portion 5a, and the substantially flat electrode plate 102A is disposed at one side of the upper surface of the tray body 14 (that is, at a print-head-31 side with the disc mounting unit 20 being the center). The second electrode plate 102A is mounted substantially perpendicularly to the upper surface of the tray body 14. The upper end thereof is in contact with the corresponding first electrode plate 102. The first electrode plate 102 and the second electrode 102A are electrically connected to each other.

The substantially flat second electrode plate 102D is disposed at a side of the upper surface of the tray body 14 opposite to the side at which the second electrode plate 102A is disposed (that is, at a side opposite to the print head 31 with the disc mounting unit 20 being the center). The second electrode plate 102D is mounted substantially perpendicularly to the upper surface of the tray body 14. The upper end thereof is in contact with the corresponding first electrode plate 102. The first electrode plate 102 and the second electrode plate 102D are electrically connected to each other.

The other structural features are similar to those of the first exemplary mist attracting unit 101, so that they will not be described below. Even with such mist attracting units 101A and 101D having such structures, advantages similar to those of the first exemplary mist attracting unit 101 may be obtained.

In the second exemplary mist attracting unit 101A, the mist M floating towards the side wall of the housing 3 as indicated by the arrow Mb in FIGS. 16 and 17 can be adsorbed by the second electrode plate 102A. Therefore, the mist M which collides with the side wall of the housing 3 and is scattered when the second electrode plate 102A is not provided can be adsorbed. At this time, the effect of providing the second electrode plate 102A makes it possible to receive gravity produced by an electric field generated by application of a voltage to the first electrode plate 102 and the second electrode plate 102A as indicated by a plurality of broken lines M (mist M) shown in FIG. 20, so that the mist M is directed to and adsorbed by the first electrode plate 102 and the second electrode plate 102A. As a result, the mist M included in the air flowing over the label surface 2a of the optical disc 2 and under the information recording surface of the optical disc 2 and supposed to float as indicated by the arrow Mc in FIGS. 16 and 17 can be adsorbed.

Therefore, according to the mist attracting unit 101A, it is possible for the adsorption efficiency of the mist M to be greater than that provided using the mist attracting unit 101 in which the electrode plates 102 are only provided at the locations facing the label surface 2a of the optical disc 2.

The second electrode plate 102A may be disposed apart from the side wall of the housing 3 so as to be situated closer to the outer peripheral side portion of the optical disc 2. Alternatively, the second electrode plate 102A may be secured in contact with the side wall of the housing 3 so as to be easily held.

Similarly, in the second exemplary mist attracting unit 101D, the mist M floating along the side wall of the housing 3 as indicated by the arrow Me in FIGS. 18 and 19 may be adsorbed by the second electrode plate 102D. That is, the mist M which is supposed to collide with the side wall of the housing 3 and to be scattered when the second electrode plate 102D is not provided can be adsorbed. At this time, the effect of providing the second electrode plate 102D makes it possible to receive gravity produced by an electric field generated by application of a voltage to the first electrode plate 102 and the second electrode plate 102D, so that the mist M can be directed to and adsorbed by the first electrode plate 102 and the second electrode plate 102D. As a result, the mist M included in the air flowing over the label surface 2a of the optical disc 2 and under the information recording surface of the optical disc 2 after circulating in the housing 3, and supposed to float as indicated by the arrow Mf in FIGS. 18 and 19 can be adsorbed.

Therefore, according to the mist attracting unit 101D, it is possible for the adsorption efficiency of the mist M to be greater than that provided using the mist attracting unit 101 in which the electrode plates 102 are only provided at the locations facing the label surface 2a of the optical disc 2.

The second electrode plate 102D may be disposed apart from the side wall of the housing 3 so as to be situated closer to the outer peripheral side portion of the optical disc 2. Alternatively, the second electrode plate 102D may be secured in contact with the side wall of the housing 3 so as to be easily held.

Figure 22:
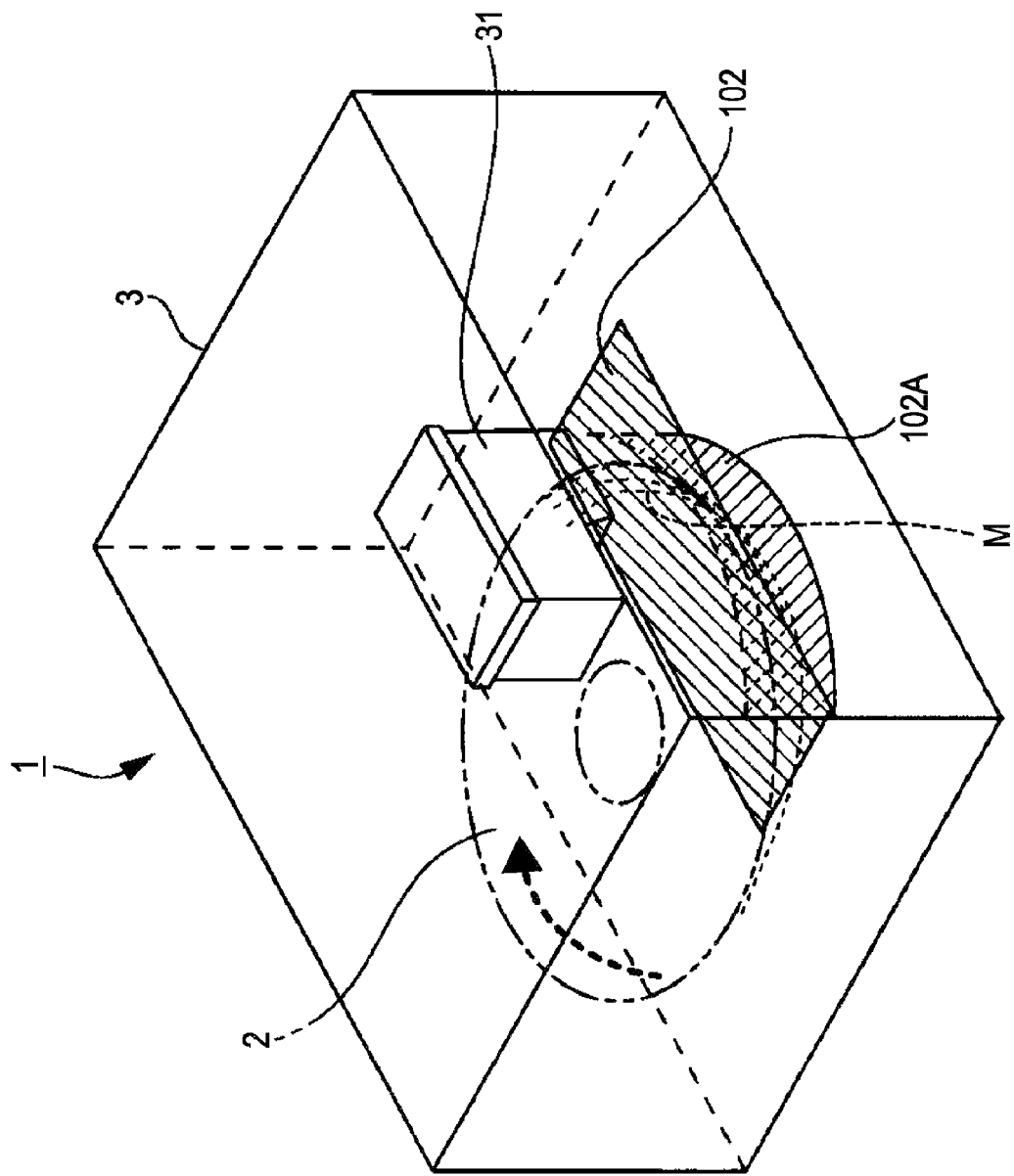
FIG. 22 is a schematic perspective view of a modification of the second exemplary mist attracting unit of the optical disc apparatus representing the disc recording and/or reproducing apparatus according to the first embodiment of the present invention.

Although, in this example, as shown in FIG. 21, the second electrode plate 102A has a flat form, the present invention is not limited thereto. For example, as shown in FIG. 22, the second electrode plate 102A may have a curved form in correspondence with the outer peripheral surface of the optical disc 2. In addition, although, in this example, as shown in FIGS. 21 and 22, the second electrode plate 102A is provided at one side of the upper surface of the tray body 14, the second electrode plate 102D, which is not shown in FIGS. 21 and 22, may obviously be provided at the other side (which is the side opposite to the print head 31 with the disc mounting unit 20 being the center) as shown in FIG. 20. In this case, similarly to the second electrode plate 102A shown in FIG. 22, the second electrode plate 102D, which is not shown in FIG. 22, may have a curved form in correspondence with the outer peripheral surface of the optical disc 2.

Further, although, in this example, the second electrode plates 102A and 102D are mounted substantially perpendicularly to the upper surface of the tray body 14, the present invention is not limited thereto. For example, they may be mounted to the side surface portions 4a of the base plate 4 or the side surface portions 5a of the upper plate 5, disposed near the respective side walls of the housing 3.

Figure 23:
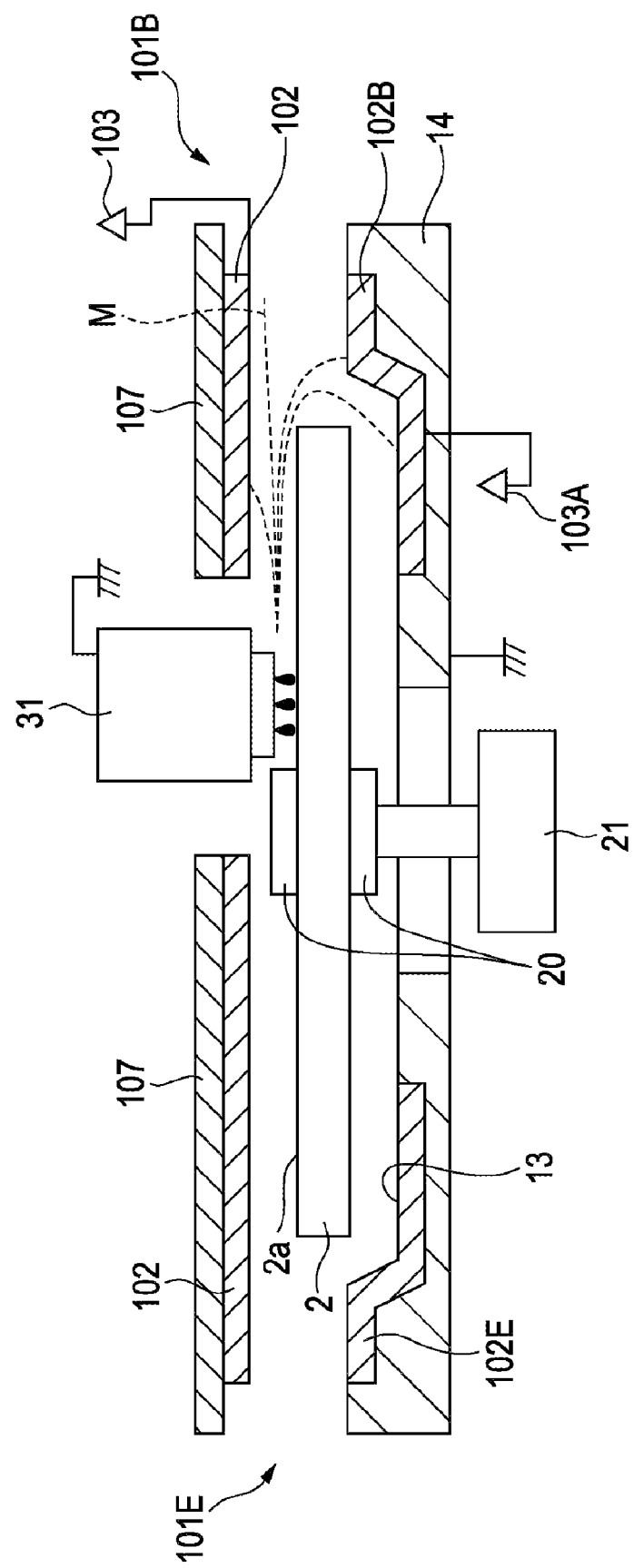
FIG. 23 illustrates in cross section third exemplary mist attracting units of the optical disc apparatus representing the disc recording and/or reproducing apparatus according to the first embodiment of the present invention.
Figure 24:
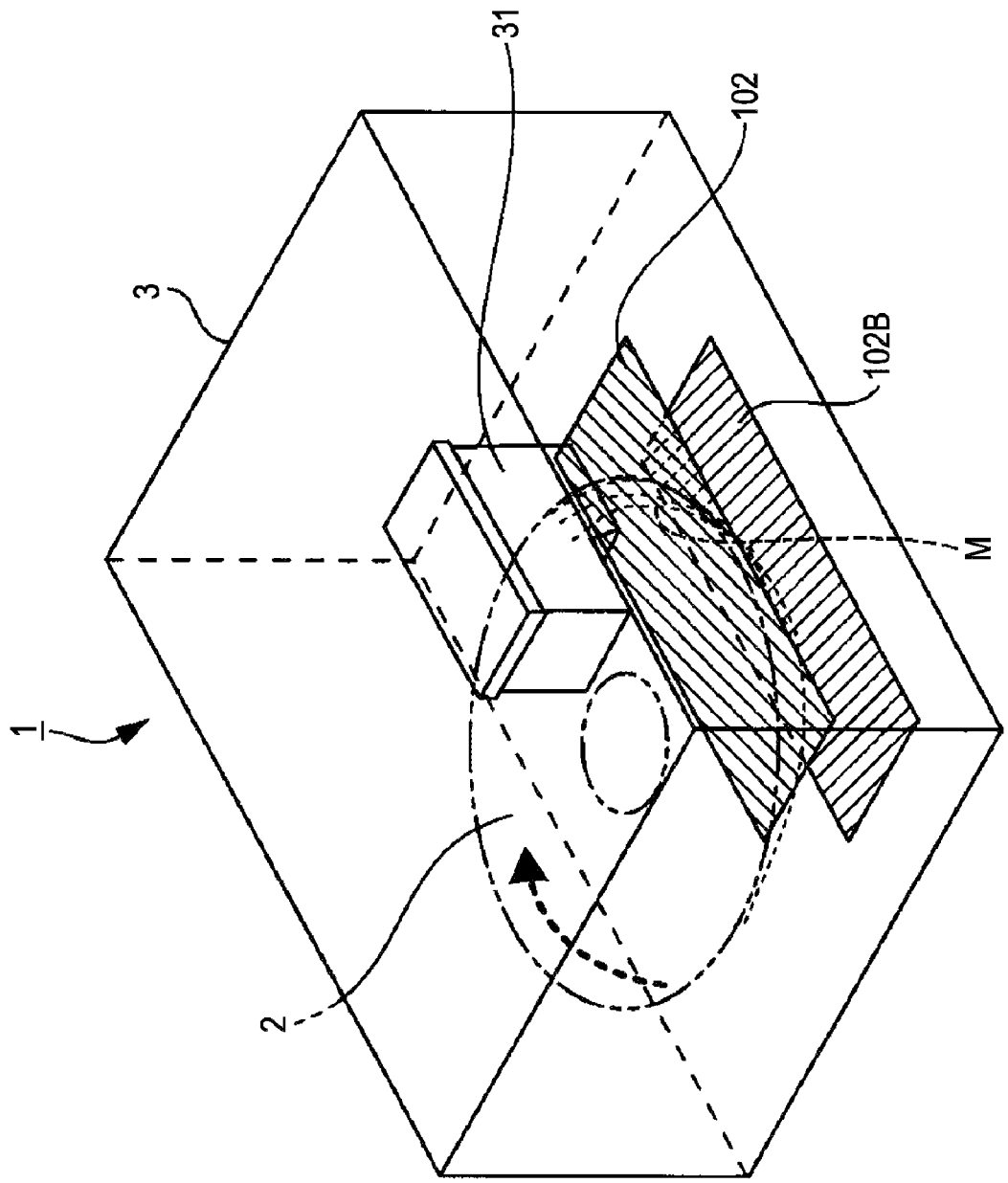
FIG. 24 is a schematic perspective view of the third exemplary mist attracting unit of the optical disc apparatus representing the disc recording and/or reproducing apparatus according to the first embodiment of the present invention.

FIGS. 23 and 24 illustrate third exemplary mist attracting units. In the third exemplary mist attracting units 101B and 110E, in addition to disposing electrode plates 101 facing the label surface 2a of the optical disc 2, third electrode plates 102B and 102E are disposed at locations facing the information recording surface situated opposite to the label surface 2a of the optical disc 2. That is, the first electrode plate is disposed at the lower surface side of the chassis plate 17, and the third electrode plate 102B is disposed at one side of the disc accommodating unit 13 (that is, at a print-head-31 side with the disc mounting unit 20 being the center). The third electrode plate 102B has a substantially crank form in correspondence with the recess of the disc accommodating unit 13. Further, a second high-voltage power supply 103A that applies a predetermined voltage to the third electrode plate 102B is provided.

The third electrode plate 102E is disposed at a side of the disc accommodating unit 13 opposite to where the third electrode plate 102B is disposed (that is, at a side opposite to the print head 31 with the disc mounting unit 20 being the center). The third electrode plate 102E has a substantially crank form in correspondence with the recess of the disc accommodating unit 13. Further, a second high-voltage power supply (not shown) that applies a predetermined voltage to the third electrode plate 102E is provided.

The other structural features are similar to those of the first exemplary mist attracting unit 101, so that they will not be described below. Even with such mist attracting units 101B and 110E having such structures, advantages similar to those of the first exemplary mist attracting unit 101 may be obtained.

In the third exemplary mist attracting unit 101B, as indicated by the arrow Mc in FIGS. 16 and 17, the mist M floating towards the information recording surface side of the optical disc 2 can be adsorbed by the third electrode plate 102B. At this time, the effect of providing the third electrode plate 102B makes it possible to receive gravity produced by an electric field generated by application of a voltage to the first electrode plate 102 and the third electrode plate 102B as indicated by a plurality of broken lines M (mist M) shown in FIG. 23, so that the mist M is directed to and adsorbed by the first electrode plate 102 and the third electrode plate 102B. As a result, the mist M included in the air flowing over the label surface 2a of the optical disc 2 and under the information recording surface of the optical disc 2 and supposed to float as indicated by the arrow Mc in FIGS. 16 and 17 can be adsorbed.

This makes it possible to prevent staining of the pickup lens of the optical pickup 23 and other units, the staining caused by the mist M floating at the information recording surface side of the optical disc 2 and adhering to the pickup lens of the optical pickup 23 and other units. In addition, it is possible to prevent the occurrence of the problem that information can no longer be recorded and/or reproduced due to the mist M adhering to the information recording surface of the optical disc 2. Therefore, according to the mist attracting unit 101B, it is possible for the adsorption efficiency of the mist M to be greater than that provided using the mist attracting unit 101 in which the electrode plates 102 are only provided at the locations facing the label surface 2a of the optical disc 2.

Similarly, in the third exemplary mist attracting unit 101E, the mist M floating along the side wall of the housing 3 as indicated by the arrow Me in FIGS. 18 and 19 can be adsorbed by the third electrode plate 102E. Therefore, the mist M which is supposed to be scattered along the side wall of the housing 3 when the third electrode plate 102E is not provided can be adsorbed. At this time, the effect of providing the third electrode plate 102E makes it possible to receive gravity produced by an electric field generated by application of a voltage to the first electrode plate 102 and the third electrode plate 102E, so that the mist M is directed to and adsorbed by the first electrode plate 102 and the third electrode plate 102E. As a result, the mist M included in the air flowing over the label surface 2a of the optical disc 2 and under the information recording surface of the optical disc 2 after circulating in the housing 3, and supposed to float as indicated by the arrow Mf in FIGS. 18 and 19 can be adsorbed.

Therefore, according to the mist attracting unit 101E, it is possible for the adsorption efficiency of the mist M to be greater than that provided using the mist attracting unit 101 in which the electrode plates 102 are only provided at the locations facing the label surface 2a of the optical disc 2.

Although, in the third example, the third electrode plates 102B and 102E are mounted to the disc accommodating unit 13, the present invention is not limited thereto. The third electrode plates 102B and 102E are disposed at locations facing the first electrode plates 102 with the optical disc 2 being disposed therebetween, and/or are disposed at the information-recording-surface side of the optical disc 2. For example, the third electrode plates 102B and 102E may be mounted to the upper surface of the base plate 4 of the housing 3.

Figure 25:
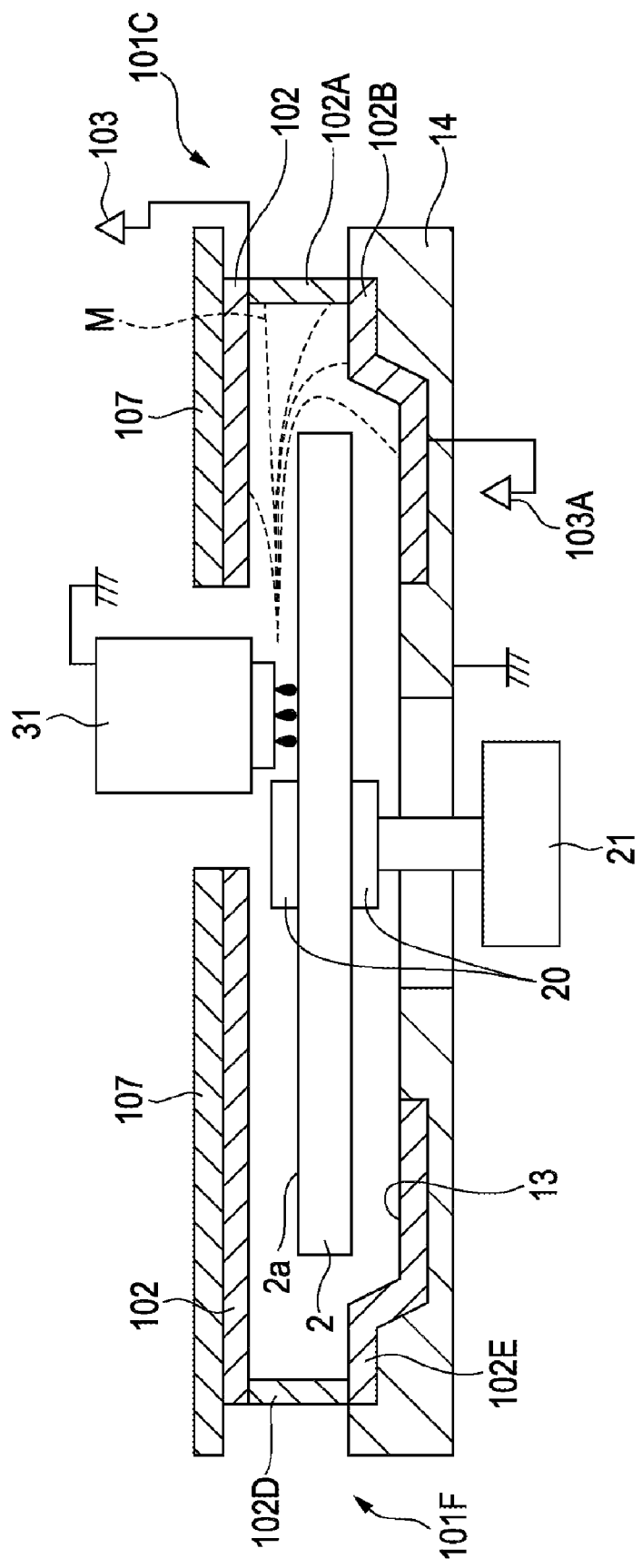
FIG. 25 illustrates in cross section fourth exemplary mist attracting units of the optical disc apparatus representing the disc recording and/or reproducing apparatus according to the first embodiment of the present invention.
Figure 26:
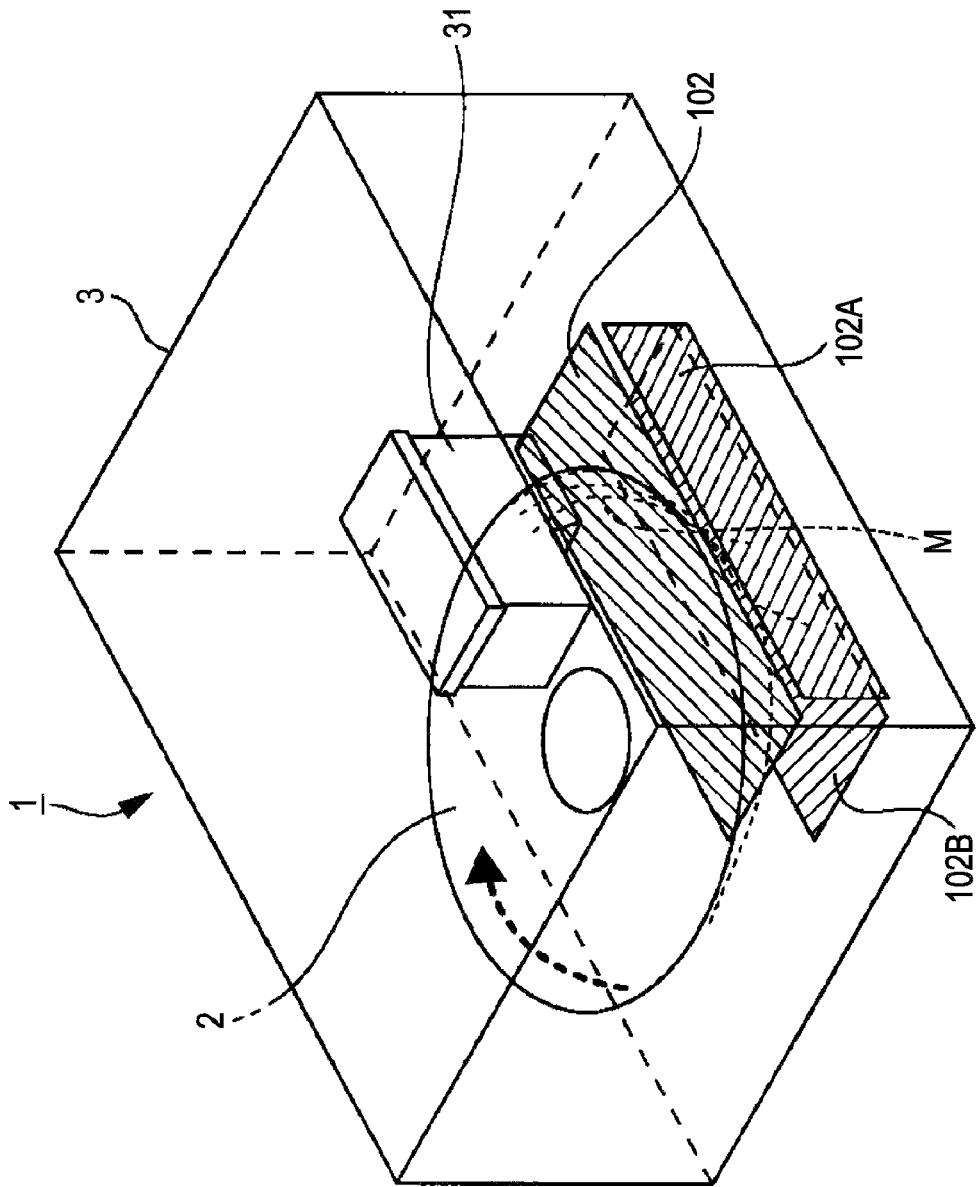
FIG. 26 is a schematic perspective view of the fourth exemplary mist attracting unit of the optical disc apparatus representing the disc recording and/or reproducing apparatus according to the first embodiment of the present invention.

FIGS. 25 and 26 illustrate fourth exemplary mist attracting units. The fourth exemplary mist attracting unit 101C is a combination of the second exemplary mist attracting unit 101A and the third exemplary mist attracting unit 101B. That is, in addition to disposing the electrode plate 102 facing the label surface 2a of the optical disc 2, the second electrode plate 102A is disposed at a location facing a side (outer side in a radial direction) of the optical disc 2, and the third electrode plate 102B is disposed at a location facing the information recording surface of the optical disc 2.

The fourth exemplary mist attracting unit 101F is a combination of the second exemplary mist attracting unit 101D and the third exemplary mist attracting unit 101E. That is, in addition to disposing the electrode plate 102 facing the label surface 2a of the optical disc 2, the substantially flat second electrode plate 102D is disposed at a side opposite to where the second electrode plate 102A is disposed (that is, at a side opposite to the print head 31 with the disc mounting unit 20 being the center), and the third electrode plate 102E is disposed at a side opposite to where the third electrode plate 102B is disposed (that is, at the side opposite to the head unit 31 with the disc mounting unit 20 being the center).

The other structural features are similar to those of the first exemplary mist attracting unit 101, so that they will not be described below. Even with such mist attracting units 101C and 101F having such structures, advantages similar to those of the first exemplary mist attracting unit 101 may be obtained.

According to the fourth exemplary mist attracting unit 101C, the mist M directed towards the side wall of the housing 3 as indicated by the arrow Mb shown in FIGS. 16 and 17 and the mist M floating towards the information recording surface of the optical disc 2 as indicated by the arrow Mc shown in FIGS. 16 and 17 can be efficiently adsorbed, so that cleaning performance in the housing 3 can be improved. At this time, the effect of providing the second electrode plate 102A and the third electrode plate 102B makes it possible to receive gravity produced by an electric field generated by application of a voltage to the first to third electrode plates 102 to 102B as indicated by a plurality of broken lines M (mist M) shown in FIG. 25, so that the mist M can be directed to and adsorbed by the first to third electrode plates 102 to 102B.

Therefore, it is possible to considerably reduce the amount of mist M floating in the housing 3, and to efficiently prevent the pickup lens of the optical pickup 23 and other devices from becoming stained by the mist M. Further, by considerably reducing the amount of floating mist M, it is possible to reduce staining of portions of the interior of the housing 3 which are touched by and are visible to a user. As a result, it is possible to prevent staining of the clothes and skin of the user. In addition, when portions that the user touches or can see are stained, the user may think that, for example, an operation failure has occurred in the device. However, keeping the interior of the housing 3 clean can prevent the user from thinking that, for example, an operation failure has occurred in the device.

Figure 27:
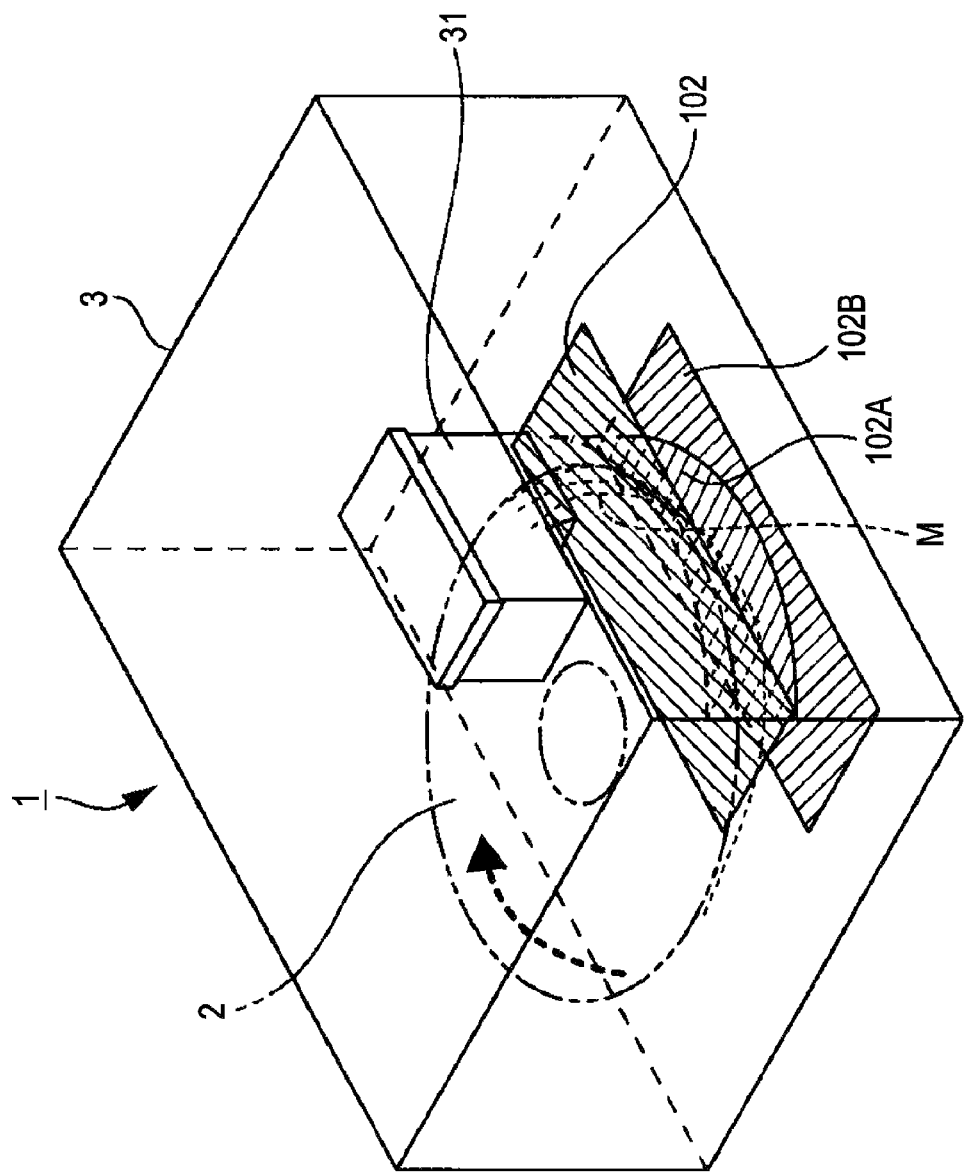
FIG. 27 is a schematic perspective view of the fourth exemplary mist attracting unit of the optical disc apparatus representing the disc recording and/or reproducing apparatus according to the first embodiment of the present invention.

Even in the fourth exemplary mist attracting unit 101C, similarly to the second exemplary mist attracting unit 101A, as shown in FIG. 27, the second electrode plate 102A facing a side, which a radial-direction outer side, of the optical disc 2 may have a curved form in correspondence with the outer peripheral surface of the optical disc 2.

Similarly, according to the fourth exemplary mist attracting unit 101F, the mist M directed towards the side wall of the housing 3 as indicated by the arrow Me shown in FIGS. 18 and 19 and the mist M included in the air flowing over the label surface 2a of the optical disc 2 and under the information recording surface of the optical disc 2 after the mist M has circulated in the housing 3 can be efficiently adsorbed, so that cleaning performance in the housing 3 can be improved. At this time, the effect of providing the second electrode plate 102D and the third electrode plate 102E makes it possible to receive gravity produced by an electric field generated by application of a voltage to the first to third electrode plates 102 to 102E, so that the mist M is directed to and adsorbed by the first to third electrode plates 102 to 102E.

Therefore, it is possible to considerably reduce the amount of mist M floating in the housing 3, and to efficiently prevent the pickup lens of the optical pickup 23 and other devices from becoming stained by the mist M. Further, by considerably reducing the amount of floating mist M, it is possible to reduce staining of portions of the interior of the housing 3 which are touched by and are visible to a user.

Even in the fourth exemplary mist attracting unit 101F, similarly to the second electrode plate 102A facing a side, which a radial-direction outer side, of the optical disc 2 shown in FIG. 27, the second electrode plate 102D, which is not shown in FIG. 27, may have a curved form in correspondence with the outer peripheral surface of the optical disc 2.

As described above, a mist attracting unit that attracts and adsorbs mist thereto using electrostatic force by generating an electric field by applying a predetermined voltage to the electrode plates is provided. Therefore, it is possible to adsorb the mist generated during printing, and to prevent a pickup lens of an optical pickup and other devices from becoming stained by the mist. Since a non-transmission portion and a mist adsorbing section are provided at the surfaces of the electrode plates of the mist attracting unit facing an optical disc, it is possible to prevent the moisture of the mist from adhering to the electrode plates, so that it is possible to prevent an electric leakage, an electric discharge, and electrification.

The present invention is not limited to the above-described and illustrated embodiment and examples, so that various modifications may occur within the scope not departing from the gist of the present invention. For example, although, in the embodiment and examples, a DVD-RW is used as a recording medium, the present invention may be applied to an optical disc apparatus including a printing device using other types of recording media, such as a magneto-optical disc or a magnetic disc. Further, the disc recording and/or reproducing apparatus according to the embodiment of the present invention is not limited to an optical disc recording/reproducing apparatus that can perform both a recording operation and a reproducing operation. The present invention may also be applied to a disc recording or a disc reproducing apparatus, an image pickup device, a personal computer, an electronic dictionary, a car navigator, or other types of electronic devices capable of using this type of printing device.

What is claimed is:

1. A disc recording and/or reproducing apparatus comprising:
   a disc mounting unit arranged to have a disc recording medium removably mounted thereon, the disc mounting unit rotating the disc recording medium;
   a print head to discharge an ink drop towards a label surface of the disc recording medium when the disc recording medium is rotationally driven by the disc mounting unit; and
   a mist attracting unit to, by applying a voltage, attract mist of the ink drop discharged from the print head, the mist attracting unit having an electrode plate with first and second plate portions arranged to be spaced from, and located on different sides of, the disc recording medium when the disc recording medium is removably mounted on the disc mounting unit, with the print head located between the plate portions.

2. The disc recording and/or reproducing apparatus according to claim 1, wherein the mist attracting unit includes a high-voltage power supply, the electrode plate being arranged to face, when the disc recording medium is mounted to the disc mounting unit, the label surface of the disc recording medium, an information recording surface provided opposite to the label surface, and/or a radial-direction outer side of the disc recording medium, the high-voltage power supply applying the voltage to the electrode plate.

3. The disc recording and/or reproducing apparatus according to claim 2, wherein the electrode plate arranged to face the radial-direction outer side of the disc recording medium is curved in correspondence with an outer peripheral surface of the disc recording medium.

4. The disc recording and/or reproducing apparatus according to claim 2, wherein the voltage is applied to the electrode plate so that a strength of an electric field generated by applying the voltage to the mist attracting unit, disposed near the rotationally driven disc recording medium, becomes greater than or equal to 200 kV/m.

5. The disc recording and/or reproducing apparatus according to claim 2, wherein a mist adsorbing section that attracts the mist is provided at a surface of the electrode plate that is arranged to face the disc recording medium.

6. The disc recording and/or reproducing apparatus according to claim 5, wherein a non-transmission portion is interposed between the electrode plate and the mist adsorbing section, the non-transmission portion preventing moisture of the mist attracted to the mist adsorbing section from moving to the electrode plate.

7. A mist adsorbing method of a disc recording and/or reproducing apparatus, comprising the step of:
   applying a voltage to a mist attracting unit having an electrode with first and second portions, disposed with the electrode portions spaced from and on different sides of a rotationally driven disc recording medium, to apply the voltage to mist and an ink drop discharged towards a label surface of the disc recording medium, thereby attracting the mist to the mist attracting unit.

* * * * *